(12) United States Patent
Chui et al.

(10) Patent No.: US 7,553,684 B2
(45) Date of Patent: Jun. 30, 2009

(54) METHOD OF FABRICATING INTERFEROMETRIC DEVICES USING LIFT-OFF PROCESSING TECHNIQUES

(75) Inventors: Clarence Chui, San Mateo, CA (US); Ming-Hau Tung, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 523 days.

(21) Appl. No.: 11/155,379

(22) Filed: Jun. 17, 2005

(65) Prior Publication Data

US 2006/0067644 A1 Mar. 30, 2006

Related U.S. Application Data

(60) Provisional application No. 60/613,496, filed on Sep. 27, 2004.

(51) Int. Cl.
*H01L 21/00* (2006.01)
*G02F 1/03* (2006.01)
*G02F 1/07* (2006.01)

(52) U.S. Cl. .......................................... 438/31; 359/247

(58) Field of Classification Search .................. 438/31; 359/247
See application file for complete search history.

(56) References Cited

U.S. PATENT DOCUMENTS

| | | | |
|---|---|---|---|
| 2,534,846 A | 12/1950 | Ambrose et al. |
| 3,439,973 A | 4/1969 | Paul et al. |
| 3,443,854 A | 5/1969 | Weiss |
| 3,616,312 A | 10/1971 | McGriff et al. |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |

(Continued)

FOREIGN PATENT DOCUMENTS

CH 681 047 12/1992

(Continued)

OTHER PUBLICATIONS

Hall, Neal "Integrated optical interferometric detection method for micromachined capacitive acoustic transducers" App. Phy. Let. vol. 80 No. 20 May 20, 2002 pp. 3859-3861.*

(Continued)

*Primary Examiner*—N Drew Richards
*Assistant Examiner*—Grant S Withers
(74) *Attorney, Agent, or Firm*—Knobbe Martens Olson & Bear LLP

(57) ABSTRACT

Embodiments of the present disclosure include a method of fabricating interferometric devices using lift-off processing techniques. Use of lift-off processing in the fabrication of various layers of interferometric modulators, such as an optical stack or a flex layer, advantageously avoids individualized chemistries associated with the plurality of materials associated with each layer thereof. Moreover, use of lift-off processing allows much greater selection in both materials and facilities available for fabrication of interferometric modulators.

18 Claims, 16 Drawing Sheets

U.S. PATENT DOCUMENTS

| | | | |
|---|---|---|---|
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,617,608 A | 10/1986 | Blonder et al. |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,859,060 A | 8/1989 | Kitagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,030,319 A | 7/1991 | Nishino et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,330,617 A | 7/1994 | Haond |
| 5,331,454 A | 7/1994 | Hornbeck |
| 5,339,116 A | 8/1994 | Urbanus et al. |
| 5,345,328 A | 9/1994 | Fritz et al. |
| 5,347,377 A | 9/1994 | Revelli, Jr. et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |

| | | | | | | |
|---|---|---|---|---|---|---|
| 5,619,365 | A | 4/1997 | Rhoades et al. | 6,232,936 B1 | 5/2001 | Gove et al. |
| 5,619,366 | A | 4/1997 | Rhoads et al. | 6,243,149 B1 | 6/2001 | Swanson et al. |
| 5,622,814 | A | 4/1997 | Miyata et al. | 6,246,398 B1 | 6/2001 | Koo |
| 5,629,790 | A | 5/1997 | Neukermans et al. | 6,249,039 B1 | 6/2001 | Harvey et al. |
| 5,633,652 | A | 5/1997 | Kanbe et al. | 6,282,010 B1 | 8/2001 | Sulzbach et al. |
| 5,636,052 | A | 6/1997 | Arney et al. | 6,284,560 B1 | 9/2001 | Jech et al. |
| 5,636,185 | A | 6/1997 | Brewer et al. | 6,295,154 B1 | 9/2001 | Laor et al. |
| 5,638,084 | A | 6/1997 | Kalt | 6,297,072 B1 | 10/2001 | Tilmans et al. |
| 5,638,946 | A | 6/1997 | Zavracky | 6,323,982 B1 | 11/2001 | Hornbeck |
| 5,641,391 | A | 6/1997 | Hunter et al. | 6,327,071 B1 | 12/2001 | Kimura et al. |
| 5,646,768 | A | 7/1997 | Kaeiyama | 6,329,297 B1 | 12/2001 | Balish et al. |
| 5,647,819 | A | 7/1997 | Fujita et al. | 6,335,831 B2 | 1/2002 | Kowarz et al. |
| 5,650,834 | A | 7/1997 | Nakagawa et al. | 6,351,329 B1 | 2/2002 | Greywal |
| 5,650,881 | A | 7/1997 | Hornbeck | 6,356,254 B1 | 3/2002 | Kimura |
| 5,654,741 | A | 8/1997 | Sampsell et al. | 6,376,787 B1 | 4/2002 | Martin et al. |
| 5,657,099 | A | 8/1997 | Doherty et al. | 6,391,675 B1 | 5/2002 | Ehmke et al. |
| 5,659,374 | A | 8/1997 | Gale, Jr. et al. | 6,392,233 B1 | 5/2002 | Channin et al. |
| 5,665,997 | A | 9/1997 | Weaver et al. | 6,392,781 B1 | 5/2002 | Kim et al. |
| 5,673,139 | A | 9/1997 | Johnson | 6,407,851 B1 | 6/2002 | Islam et al. |
| 5,674,757 | A | 10/1997 | Kim | 6,447,126 B1 | 9/2002 | Hornbeck |
| 5,683,591 | A | 11/1997 | Offenberg | 6,452,465 B1 | 9/2002 | Brown et al. |
| 5,703,710 | A | 12/1997 | Brinkman et al. | 6,456,420 B1 | 9/2002 | Goodwin-Johansson |
| 5,706,022 | A | 1/1998 | Hato | 6,465,355 B1 | 10/2002 | Horsley |
| 5,710,656 | A | 1/1998 | Goosen | 6,466,354 B1 | 10/2002 | Gudeman |
| 5,726,480 | A | 3/1998 | Pister | 6,466,358 B2 | 10/2002 | Tew |
| 5,739,945 | A | 4/1998 | Tayebati | 6,473,274 B1 | 10/2002 | Maimone et al. |
| 5,745,193 | A | 4/1998 | Urbanus et al. | 6,480,177 B2 | 11/2002 | Doherty et al. |
| 5,745,281 | A | 4/1998 | Yi et al. | 6,496,122 B2 | 12/2002 | Sampsell |
| 5,759,334 | A | 6/1998 | Kojima et al. | 6,513,911 B1 | 2/2003 | Ozaki et al. |
| 5,771,116 | A | 6/1998 | Miller et al. | 6,522,801 B1 | 2/2003 | Aksyuk et al. |
| 5,784,190 | A | 7/1998 | Worley | 6,531,945 B1 | 3/2003 | Ahn et al. |
| 5,784,212 | A | 7/1998 | Hornbeck | 6,537,427 B1 | 3/2003 | Raina et al. |
| 5,785,877 | A | 7/1998 | Sato et al. | 6,545,335 B1 | 4/2003 | Chua et al. |
| 5,793,504 | A | 8/1998 | Stoll | 6,548,908 B2 | 4/2003 | Chua et al. |
| 5,808,780 | A | 9/1998 | McDonald | 6,549,338 B1 | 4/2003 | Wolverton et al. |
| 5,818,095 | A | 10/1998 | Sampsell | 6,552,840 B2 | 4/2003 | Knipe |
| 5,822,170 | A | 10/1998 | Cabuz et al. | 6,574,033 B1 | 6/2003 | Chui et al. |
| 5,824,608 | A | 10/1998 | Gotoch et al. | 6,577,785 B1 | 6/2003 | Spahn et al. |
| 5,825,528 | A | 10/1998 | Goossen | 6,589,625 B1 | 7/2003 | Kothari et al. |
| 5,835,255 | A | 11/1998 | Miles | 6,600,201 B2 | 7/2003 | Hartwell et al. |
| 5,838,484 | A | 11/1998 | Goosen et al. | 6,606,175 B1 | 8/2003 | Sampsell et al. |
| 5,842,088 | A | 11/1998 | Thompson | 6,608,268 B1 | 8/2003 | Goldsmith |
| 5,867,302 | A | 2/1999 | Fleming et al. | 6,610,440 B1 | 8/2003 | LaFollette et al. |
| 5,906,536 | A | 5/1999 | Imazato et al. | 6,625,047 B2 | 9/2003 | Coleman, Jr. |
| 5,912,758 | A | 6/1999 | Knipe et al. | 6,630,786 B2 | 10/2003 | Cummings et al. |
| 5,943,158 | A | 8/1999 | Ford et al. | 6,632,698 B2 | 10/2003 | Ives |
| 5,959,763 | A | 9/1999 | Bozler et al. | 6,635,919 B1 | 10/2003 | Melendez et al. |
| 5,972,193 | A | 10/1999 | Chou et al. | 6,642,913 B1 | 11/2003 | Kimura et al. |
| 5,976,902 | A | 11/1999 | Shih | 6,643,069 B2 | 11/2003 | Dewald |
| 5,986,796 | A | 11/1999 | Miles | 6,650,455 B2 | 11/2003 | Miles |
| 6,016,693 | A | 1/2000 | Viani et al. | 6,657,832 B2 | 12/2003 | Williams et al. |
| 6,028,690 | A | 2/2000 | Carter et al. | 6,666,561 B1 | 12/2003 | Blakley |
| 6,038,056 | A | 3/2000 | Florence et al. | 6,674,562 B1 | 1/2004 | Miles et al. |
| 6,040,937 | A | 3/2000 | Miles | 6,674,563 B2 | 1/2004 | Chui et al. |
| 6,049,317 | A | 4/2000 | Thompson et al. | 6,680,792 B2 | 1/2004 | Miles |
| 6,055,090 | A | 4/2000 | Miles | 6,687,896 B1 | 2/2004 | Royce et al. |
| 6,057,903 | A | 5/2000 | Colgan et al. | 6,710,908 B2 | 3/2004 | Miles et al. |
| 6,061,075 | A | 5/2000 | Nelson et al. | 6,720,267 B1 | 4/2004 | Chen et al. |
| 6,099,132 | A | 8/2000 | Kaeriyama | 6,736,987 B1 | 5/2004 | Cho |
| 6,100,872 | A | 8/2000 | Aratani et al. | 6,741,377 B2 | 5/2004 | Miles |
| 6,113,239 | A | 9/2000 | Sampsell et al. | 6,741,384 B1 | 5/2004 | Martin et al. |
| 6,115,326 | A | 9/2000 | Puma et al. | 6,741,503 B1 | 5/2004 | Farris et al. |
| 6,136,630 | A | 10/2000 | Weigold | 6,743,570 B2 | 6/2004 | Harnett et al. |
| 6,147,790 | A | 11/2000 | Meier et al. | 6,747,785 B2 | 6/2004 | Chen et al. |
| 6,158,156 | A | 12/2000 | Patrick | 6,747,800 B1 | 6/2004 | Lin |
| 6,160,833 | A | 12/2000 | Floyd et al. | 6,756,317 B2 | 6/2004 | Sniegowski et al. |
| 6,166,422 | A | 12/2000 | Qian et al. | 6,768,097 B1 | 7/2004 | Viktorovitch et al. |
| 6,180,428 | B1 | 1/2001 | Peeters et al. | 6,775,174 B2 | 8/2004 | Huffman et al. |
| 6,194,323 | B1 | 2/2001 | Downey et al. | 6,778,155 B2 | 8/2004 | Doherty et al. |
| 6,195,196 | B1 | 2/2001 | Kimura et al. | 6,778,306 B2 | 8/2004 | Sniegowski et al. |
| 6,201,633 | B1 | 3/2001 | Peeters et al. | 6,791,692 B2 | 9/2004 | Powell et al. |
| 6,204,080 | B1 | 3/2001 | Hwang | 6,794,119 B2 | 9/2004 | Miles |
| 6,215,221 | B1 | 4/2001 | Cabuz et al. | 6,811,267 B1 | 11/2004 | Allen et al. |

| | | | | | | |
|---|---|---|---|---|---|---|
| 6,812,482 B2 | 11/2004 | Fleming et al. | | 2004/0051929 A1 | 3/2004 | Sampsell et al. |
| 6,814,814 B2 | 11/2004 | Collins et al. | | 2004/0053434 A1 | 3/2004 | Bruner |
| 6,819,469 B1 | 11/2004 | Koba | | 2004/0058532 A1 | 3/2004 | Miles et al. |
| 6,822,628 B2 | 11/2004 | Dunphy et al. | | 2004/0061543 A1 | 4/2004 | Nam et al. |
| 6,829,132 B2 | 12/2004 | Martin et al. | | 2004/0063322 A1 | 4/2004 | Yang |
| 6,853,129 B1 | 2/2005 | Cummings et al. | | 2004/0080807 A1 | 4/2004 | Chen et al. |
| 6,855,610 B2 | 2/2005 | Tung et al. | | 2004/0080832 A1 | 4/2004 | Singh |
| 6,859,218 B1 | 2/2005 | Luman et al. | | 2004/0087086 A1 | 5/2004 | Lee |
| 6,861,277 B1 | 3/2005 | Monroe et al. | | 2004/0100677 A1 | 5/2004 | Huibers et al. |
| 6,862,022 B2 | 3/2005 | Slupe | | 2004/0124073 A1 | 7/2004 | Pilans et al. |
| 6,862,029 B1 | 3/2005 | D'Souza et al. | | 2004/0125281 A1 | 7/2004 | Lin et al. |
| 6,867,896 B2 | 3/2005 | Miles | | 2004/0125282 A1 | 7/2004 | Lin et al. |
| 6,870,581 B2 | 3/2005 | Li et al. | | 2004/0125536 A1 | 7/2004 | Arney et al. |
| 6,870,654 B2 | 3/2005 | Lin et al. | | 2004/0136076 A1 | 7/2004 | Tayebati |
| 6,882,458 B2 | 4/2005 | Lin et al. | | 2004/0145049 A1 | 7/2004 | McKinnell et al. |
| 6,882,461 B1 | 4/2005 | Tsai et al. | | 2004/0145811 A1 | 7/2004 | Lin et al. |
| 6,905,621 B2 | 6/2005 | Ho et al. | | 2004/0147056 A1 | 7/2004 | McKinnell et al. |
| 6,912,022 B2 | 6/2005 | Lin et al. | | 2004/0147198 A1 | 7/2004 | Lin et al. |
| 6,952,303 B2 | 10/2005 | Lin et al. | | 2004/0148009 A1 | 7/2004 | Buzzard |
| 6,952,304 B2 | 10/2005 | Mushika et al. | | 2004/0150869 A1 | 8/2004 | Kasai |
| 6,958,847 B2 | 10/2005 | Lin | | 2004/0150915 A1 | 8/2004 | Thomas et al. |
| 6,980,350 B2 | 12/2005 | Hung et al. | | 2004/0160143 A1 | 8/2004 | Shreeve et al. |
| 6,982,820 B2 | 1/2006 | Tsai | | 2004/0163758 A1 | 8/2004 | Kagan et al. |
| 6,995,890 B2 | 2/2006 | Lin | | 2004/0174583 A1 | 9/2004 | Chen et al. |
| 6,999,225 B2 | 2/2006 | Lin | | 2004/0175577 A1 | 9/2004 | Lin et al. |
| 6,999,236 B2 | 2/2006 | Lin | | 2004/0179281 A1 | 9/2004 | Reboa |
| 7,041,224 B2 | 5/2006 | Patel et al. | | 2004/0179445 A1 | 9/2004 | Park |
| 7,064,089 B2 | 6/2006 | Yamazaki et al. | | 2004/0191937 A1 | 9/2004 | Patel et al. |
| 7,123,216 B1 | 10/2006 | Miles | | 2004/0207897 A1 | 10/2004 | Lin |
| 7,126,738 B2 * | 10/2006 | Miles ........................ 359/245 | | 2004/0209192 A1 | 10/2004 | Lin et al. |
| 7,256,922 B2 | 8/2007 | Chui et al. | | 2004/0209195 A1 | 10/2004 | Lin |
| 2001/0003487 A1 | 6/2001 | Miles | | 2004/0212026 A1 | 10/2004 | Van Brocklin et al. |
| 2001/0026951 A1 | 10/2001 | Vergani et al. | | 2004/0217378 A1 | 11/2004 | Martin et al. |
| 2001/0040649 A1 | 11/2001 | Ozaki | | 2004/0217919 A1 | 11/2004 | Pichl et al. |
| 2001/0040675 A1 | 11/2001 | True et al. | | 2004/0218251 A1 | 11/2004 | Piehl et al. |
| 2002/0015215 A1 | 2/2002 | Miles | | 2004/0218334 A1 | 11/2004 | Martin et al. |
| 2002/0021485 A1 | 2/2002 | Pilossof | | 2004/0218341 A1 | 11/2004 | Martin et al. |
| 2002/0024711 A1 | 2/2002 | Miles | | 2004/0227493 A1 | 11/2004 | Van Brocklin et al. |
| 2002/0036304 A1 | 3/2002 | Ehmke et al. | | 2004/0233503 A1 | 11/2004 | Kimura |
| 2002/0054424 A1 | 5/2002 | Miles | | 2004/0240027 A1 | 12/2004 | Lin et al. |
| 2002/0055253 A1 | 5/2002 | Rudhard | | 2004/0240032 A1 | 12/2004 | Miles |
| 2002/0071169 A1 | 6/2002 | Bowers et al. | | 2004/0240138 A1 | 12/2004 | Martin et al. |
| 2002/0075555 A1 | 6/2002 | Miles | | 2004/0245588 A1 | 12/2004 | Nikkel et al. |
| 2002/0086455 A1 | 7/2002 | Franosch et al. | | 2004/0263944 A1 | 12/2004 | Miles et al. |
| 2002/0126364 A1 | 9/2002 | Miles | | 2005/0001828 A1 | 1/2005 | Martin et al. |
| 2002/0131682 A1 | 9/2002 | Nasiri et al. | | 2005/0003667 A1 | 1/2005 | Lin et al. |
| 2002/0135857 A1 | 9/2002 | Fitzpatrick et al. | | 2005/0020089 A1 | 1/2005 | Shi et al. |
| 2002/0137072 A1 | 9/2002 | Mirkin et al. | | 2005/0024557 A1 | 2/2005 | Lin |
| 2002/0149828 A1 | 10/2002 | Miles | | 2005/0035699 A1 | 2/2005 | Tsai |
| 2002/0168136 A1 | 11/2002 | Atia et al. | | 2005/0036095 A1 | 2/2005 | Yeh et al. |
| 2003/0003372 A1 | 1/2003 | Hutchinson | | 2005/0036192 A1 | 2/2005 | Lin et al. |
| 2003/0006468 A1 | 1/2003 | Ma et al. | | 2005/0038950 A1 | 2/2005 | Adelmann |
| 2003/0043157 A1 | 3/2003 | Miles | | 2005/0042117 A1 | 2/2005 | Lin |
| 2003/0054588 A1 | 3/2003 | Patel et al. | | 2005/0046922 A1 | 3/2005 | Lin et al. |
| 2003/0062186 A1 | 4/2003 | Boroson et al. | | 2005/0046948 A1 | 3/2005 | Lin |
| 2003/0072070 A1 | 4/2003 | Miles | | 2005/0057442 A1 | 3/2005 | Way |
| 2003/0073042 A1 | 4/2003 | Cernigliaro et al. | | 2005/0068583 A1 | 3/2005 | Gutkowski et al. |
| 2003/0077843 A1 | 4/2003 | Yamauchi et al. | | 2005/0068605 A1 | 3/2005 | Tsai |
| 2003/0090350 A1 | 5/2003 | Feng et al. | | 2005/0068606 A1 | 3/2005 | Tsai |
| 2003/0112096 A1 | 6/2003 | Potter | | 2005/0069209 A1 | 3/2005 | Damera-Venkata et al. |
| 2003/0118920 A1 | 6/2003 | Johnstone et al. | | 2005/0078348 A1 | 4/2005 | Lin |
| 2003/0138213 A1 | 7/2003 | Jiin et al. | | 2005/0168849 A1 | 8/2005 | Lin |
| 2003/0152872 A1 | 8/2003 | Miles | | 2005/0195462 A1 | 9/2005 | Lin |
| 2003/0201784 A1 | 10/2003 | Potter | | 2005/0195467 A1 | 9/2005 | Kothari et al. |
| 2003/0202264 A1 | 10/2003 | Weber et al. | | 2005/0202649 A1 | 9/2005 | Hung et al. |
| 2003/0202265 A1 | 10/2003 | Reboa et al. | | 2006/0024880 A1 | 2/2006 | Chui et al. |
| 2003/0202266 A1 | 10/2003 | Ring et al. | | 2006/0066932 A1 | 3/2006 | Chui |
| 2003/0231373 A1 | 12/2003 | Kowarz et al. | | 2006/0066935 A1 | 3/2006 | Cummings et al. |
| 2004/0010115 A1 | 1/2004 | Sotzing | | | | |
| 2004/0027636 A1 | 2/2004 | Miles | | FOREIGN PATENT DOCUMENTS | | |
| 2004/0027701 A1 | 2/2004 | Ishikawa | | | | |
| 2004/0028849 A1 | 2/2004 | Stark et al. | | CN | 092109265 | 11/2003 |
| 2004/0035821 A1 | 2/2004 | Doan et al. | | DE | 199 38 072 | 3/2000 |

| | | |
|---|---|---|
| DE | 10228946 A1 | 1/2004 |
| DE | 198 47 455 | 4/2004 |
| EP | 0 035 299 | 9/1983 |
| EP | 0173808 | 3/1986 |
| EP | 0 667 548 A1 | 8/1995 |
| EP | 0694801 A | 1/1996 |
| EP | 0695959 A | 2/1996 |
| EP | 0878824 A2 | 11/1998 |
| EP | 1197778 A | 4/2002 |
| EP | 1258860 A1 | 11/2002 |
| EP | 1 452 481 A | 9/2004 |
| JP | 405275401 A | 10/1993 |
| JP | 10500224 | 1/1998 |
| JP | 10-148644 | 6/1998 |
| JP | 10-267658 | 10/1998 |
| JP | 11-097799 | 4/1999 |
| JP | 11211999 A | 8/1999 |
| JP | 11243214 | 9/1999 |
| JP | 2000-40831 A | 2/2000 |
| JP | 2002 062493 | 2/2002 |
| JP | 2002-270575 | 9/2002 |
| JP | 2002-355800 | 12/2002 |
| JP | 2003001598 A | 1/2003 |
| JP | 2004-102022 A | 4/2004 |
| JP | 2004106074 A | 4/2004 |
| JP | 2004-212656 | 7/2004 |
| JP | 2005-005696 | 1/2005 |
| JP | 2005051007 A | 2/2005 |
| KR | 2002-9270 | 10/1999 |
| KR | 2000-0033006 | 6/2000 |
| WO | WO 92/10925 | 6/1992 |
| WO | WO 95/30924 | 11/1995 |
| WO | WO9717628 | 5/1997 |
| WO | WO 98/029748 | 7/1998 |
| WO | WO9952006 A2 | 10/1999 |
| WO | WO9952006 A3 | 10/1999 |
| WO | WO0114248 | 3/2001 |
| WO | WO 01/063657 | 8/2001 |
| WO | WO 02/24570 | 3/2002 |
| WO | WO03007049 A1 | 1/2003 |
| WO | WO 03/052506 | 6/2003 |
| WO | WO 03/069413 A | 8/2003 |
| WO | WO03069413 A1 | 8/2003 |
| WO | WO03073151 A1 | 9/2003 |
| WO | WO 03/085728 | 10/2003 |
| WO | WO2004006003 A1 | 1/2004 |
| WO | WO2004026757 A2 | 4/2004 |
| WO | WO 2005/019899 A1 | 3/2005 |

OTHER PUBLICATIONS

Aratani, et al., "Process and Design Considerations for Surface Micromachined Beams for a Tuneable Interferometer Array in Silicon", 0-7803-0957-2/93, IEEE, 1993, pp. 230-235.
Microchem, Lor™ Lift-Off Resists Datasheet, © 2002.
Written Opinion of the International Searching Authority and International Search Report for PCT/US2005/031693.
Akasaka, "Three-Dimensional IC Trends," Proceedings of IEEE, vol. 74, No. 12, pp. 1703-1714, (Dec. 1986).
Austrian Search Report dated May 4, 2005.
Austrian Search Report dated Aug. 12, 2005.
Aratani et al., "Surface micromachined tuneable interferometer array," Sensors and Actuators, pp. 17-23. (1994).
Conner, "Hybrid Color Display Using Optical Interference Filter Array," SID Digest, pp. 577-580 (1993).
EP 05255661.0 European Search Report (Dec. 30, 2005).
Fan et al., "Channel Drop Filters in Photonic Crystals," Optics Express, vol. 3, No. 1 (1998).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Goossen K.W., "MEMS-Based Variable Optical Interference Devices", Optical MEMS, 2000 IEEE/Leos International Conference on Aug. 21-24, 2000, Piscataway, NJ, USA, IEE, Aug. 21, 2000, pp. 17-18.
Gosch, "West Germany Grabs the Lead in X-Ray Lithography," Electronics pp. 78-80 (Feb. 5, 1987).
Harnett et al., "Heat-depolymerizable polycarbonates as electron beam patternable sacrificial layers for nanofluidics," J. Vac. Sci. Technol. B 19(6), (Nov./Dec. 2001), pp. 2842-2845.
Howard et al., "Nanometer-Scale Fabrication Techniques," VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics," John Wiley & Sons Inc., pp. 568-573. (date unknown).
Jerman et al., "A Miniature Fabry-Perot Interferometer with a Corrugated Silicon Diaphragm Support," (1988).
Joannopoulos et al., "Photonic Crystals: Molding the Flow of Light," Princeton University Press (1995).
Johnson, "Optical Scanners," Microwave Scanning Antennas, vol. 1, p. 251-261, (1964).
Kim et al., "Control of Optical Transmission Through Metals Perforated With Subwavelength Hole Arrays," Optic Letters, vol. 24, No. 4, pp. 256-257, (Feb. 1999).
Lee et al., "Electrostatic Actuation of Surface/Bulk Micromachined Single-Crystal Silicon Microresonators", International Conference on Intelligent Robots and Systems, vol. 2, pp. 1057-1062, (Oct. 17-21, 1999).
Lee et al., "The Surface/Bulk Micromachining (SBM) Process: A New Method for Fabricating Released MEMS in Single Crystal Silicon", Journal of Microelectromechanical Systems, vol. 8, Issue 4, pp. 409-416, (Dec. 1999).
Light over Matter, Circle No. 36 (Jun. 1993).
Lin et al., "Free-Space Micromachined Optical Switches for Optical Networking," IEEE Journal of Selected Topics in Quantum, Electronics, vol. 5, No. 1, pp. 4-9. (Jan./Feb. 1999).
Little et al., "Vertically Coupled Microring Resonator Channel Dropping Filter," IEEE Photonics Technology Letters, vol. 11, No. 2, (1999).
Magel, "Integrated Optic Devices Using Micromachined Metal Membranes," SPIE vol. 2686, 0-8194-2060-Mar. 1996.
Miles, Mark, W., "A New Reflective FPD Technology Using Interferometric Modulation," The Proceedings of the Society for Information Display (May 11-16, 1997).
Nagami et al., "Plastic Cell Architecture: Towards Reconfigurable Computing For General-Purpose," IEEE, 0-8186-8900-, pp. 68-77, (May 1998).
Newsbreaks, "Quantum-trench devices might operate at terahertz frequencies," Laser Focus World (May 1993).
Oliner et al., "Radiating Elements and Mutual Coupling," Microwave Scanning Antennas, vol. 2, pp. 131-141, (1966).
PCT/US02/13442, Search Report Sep. 13, 2002.
PCT/US04/20330 Search Report Nov. 8, 2004.
PCT/US05/029821 International Search Report (Dec. 27, 2005).
PCT/US05/030927 International Search Report (Jan. 25, 2006).
PCT/US05/032231 International Search Report (Apr. 7, 2006).
PCT/US05/033558 Partial International Search Report (Feb. 24, 2006).
PCT/US2004/035820 International Search Report and Written Opinion (Apr. 11, 2005).
PCT/US96/17731 Search Report.
Raley et al., "A Fabry-Perot Microinterferometer for Visible Wavelengths," IEEE Solid-State Sensor and Actuator Workshop, Jun. 1992, Hilton Head, SC.

Schnakenberg et al., "TMAHW Etchants for Silicon Micromachining," 1991 International Conference on Solid State Sensors and Actuators-Digest of Technical Papers, pp. 815-818 (1991).
Sperger et al., "High Performance Patterned All-Dielectric Interference Colour Filter for Display Applications," SID Digest, pp. 81-83, (1994).
Sridharan et al. "Post-Packaging Release a New Concept for Surface-Micromachined Devices" Technical Digest, IEEE Solid-State Sensor & Actuator Workshop, New York, NY, US, Nov. 8, 1998, pp. 225-228, XP000992464.
Stone, "Radiation and Optics, An Introduction to the Classical Theory," McGraw-Hill, pp. 340-343, (1963).
Walker et al., "Electron-beam-tunable Interference Filter Spatial Light Modulator," Optics Letters vol. 13, No. 5, pp. 345-347, (May 1988).
Williams et al., "Etch Rates for Micromachining Processing," Journal of Microelectromechanical Systems, vol. 5, No. 4, pp. 256-259 (Dec. 1996).
Winters et al., "The etching of silicon with XeF2 vapor. Applied Physics Letters," vol. 34, No. 1, pp. 70-73 (Jan. 1979).
Winton, "A novel way to capture solar energy," Chemical Week, (May 1985).
Wu, "Design of a Reflective Color LCD Using Optical Interference Reflectors," Asia Display '95, pp. 929-931, (Oct. 1995).
Zhou et al., "Waveguide Panel Display Using Electromechanical Spatial Modulators" SID Digest, vol. XXIX, (1998).
RCO Pt Pub 157313, May 1, 1991, FSI International.
Austrian Search Report for EX72/2005 dated May 13, 2005.
Austrian Search Report for EX81/2005 dated May 18, 2005.
Austrian Search Report for EX170/2005 dated Jul. 6, 2005.
Austrian Search Report for EX139/2005 dated Jul. 27, 2005.
Austrian Search Report for EX144/2005 dated Aug. 11, 2005.
Bains, "Digital Paper Display Technology Holds Promise For Portables," CommsDesign EE Times (2000).
Bass, Handbook of Optics, vol. 1, Fundamentals, Techniques, and Design, Second Edition, McGraw-Hill, inc. New York pp. 2.29/2.36 (1995).
Chu, et al. "Formation and Microstructures of Anodic Aluminoa Films from Aluminum Sputtered onglass Substrate" Journal of the Electrochemical Society, 149 (7) B321-B327 (2002).
Crouse, "Self-ordered pore structure of anodized aluminum on silicon and pattern transfer" Applied Physics Letters, vol. 76, No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 Jun. 1996 IOP Publishing.
Furneaux, et al. "The Formation of Controlled-porosity membranes from Anodically Oxidized Aluminium" Nature vo 337 Jan. 12, 1989, pp. 147-149.
Jerman J. H. et al., "Maniature Fabry-Perot Interferometers Micromachined in Silicon for Use in Optical Fiber WDM Systems," Transducers. San Francisco, Jun. 24-27, 1991, Proceedings of the Internatioal Conference on Solid State Sensors Andactuators, New Youk IEEE, US, vol. Conf. 6, Jun. 24, 1991.
Lieberman, "MEMS Display Looks to Give PDAs Sharper Image," EE Times (Feb. 11, 1997).
Lieberman, "Microbridges at Heart of New MEMS Displays," EE Times (Apr. 24, 1997).
Maboudian, et al. Critical Review: Adhesion in Surface Micromechanical Structures: J. Vac. Sci Techno. B 15(1) Jan./Feb. 1997, pp. 1-20.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Miles, et al., "10.1: Digital Paper for Reflective Displays," 2002 SID International Symposium Digest of Technical Papers, Boston, MA, SID International Symposium Digest of Technical Papers, San Jose, CA, vol. 33 /1, pp. 115-117 (May 21-23, 2002).
Penta Vacuum MEMS Etcher Specifications, http://www.pentavacuum.com/memes.htm.
Science and Technology, The Economist, pp. 89-90, (May 1999).
Search Report PCT/US05/031237 (Dec. 29, 2005).
Search Report PCT/US05/030033 and Written Opinion.
Search Report PCT/US05/030902.
Search Report and Written Opinion for PCT/US05/33558 (May 29, 2005).
Search Report PCT/US05/032331 (Apr. 7, 2006).
Search Report PCT/US05/032331 (Jan. 9, 2006).
Search Report and Written Opinion for PCT/US05/032647.
Tayebi et al. "Reducing the Effects of adhesion and friction in microelectomechanical systesm (MEMS) through surface roughening: Comparision Between theory and experiments" http://jap.ajp/org/jap/copyright.isp Journal of applied Physics 98, 073528 (2005).
Thin Film Transistors- Materials and Processes -vol. 1 Amorphous Silicon Thin Film Transistors ed. Yue Kuo, Kluwer Academic Publishers, Boston (2004).
Xactix Xetch X Specifications, http://xactix.com/Xtech X3specs.htm. Jan. 5, 2005.
Xactix Xetch Product Information.
IPRP for PCT/US2005/031693 filed Sep. 2, 2005.
Kawamura et al., Fabrication of fine metal microstructures packaged in the bonded glass substrates, Proceedings of SPIE, vol. 3893, pp. 486-493, 1999.
DeHon, Array-based architecture for FET-based, nanoscale electronics, IEEE Transactions on Nanotechnology, 2(1):23-32 Mar. 2003.
Office Action dated Jun. 6, 2008 in Chinese App. No. 2005800321266.
Ma et al., "A novel integrated multistage optical MEMS-mirror switch architecture design with shuffle Benes inter-stage connecting principle," Optics Communications 242 (2004), pp. 179-189.
Watanabe et al., Reduction of microtrenching and island formation in oxide plasma etching by employing electron beam charge neutralization, Applied Physics Letters, 79:17(2698-2700), Oct. 22, 2001.

* cited by examiner

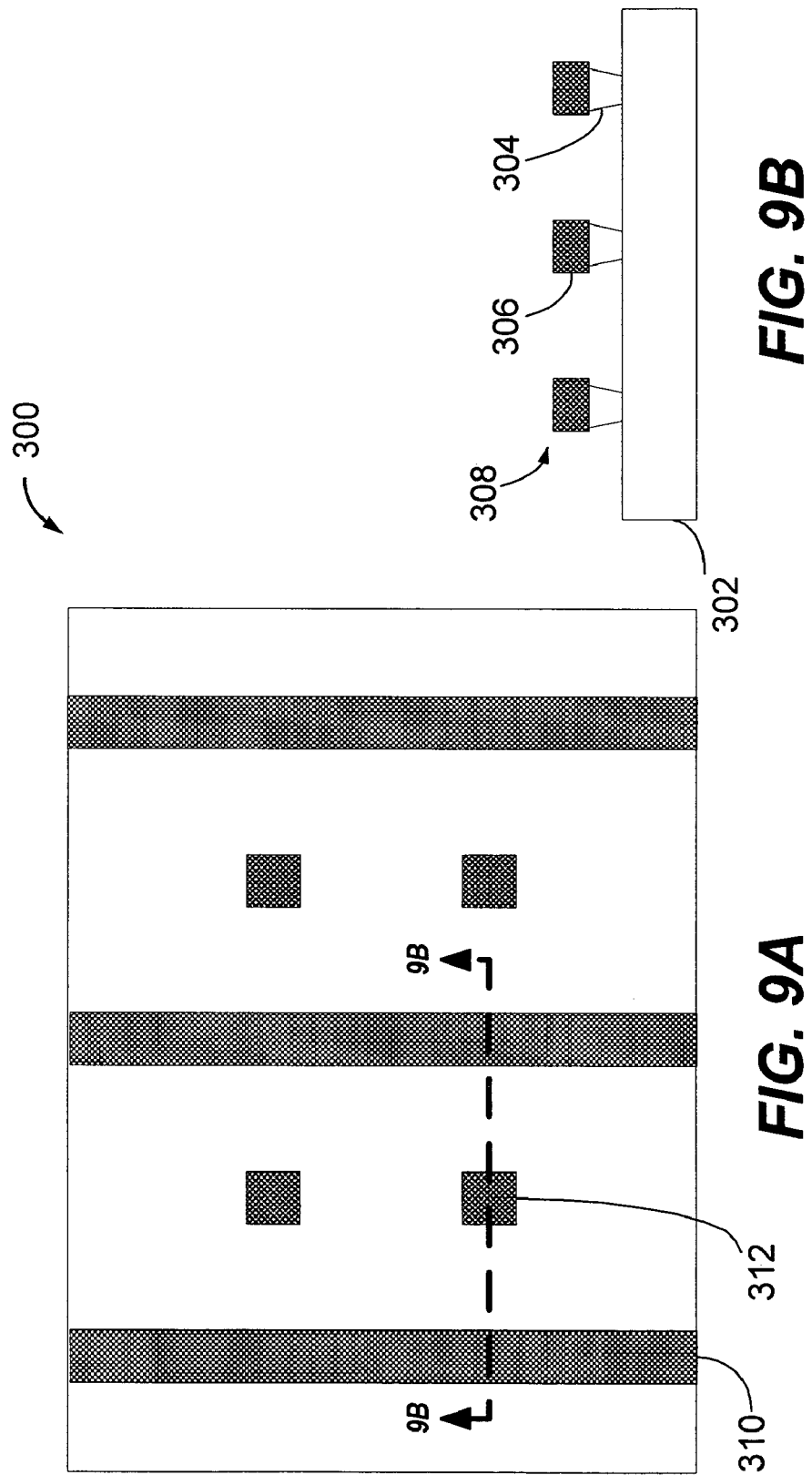

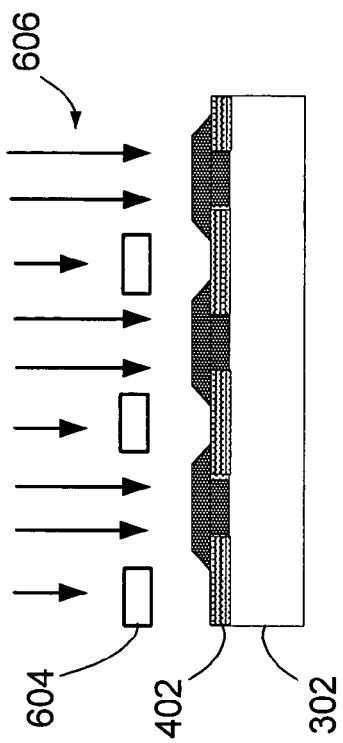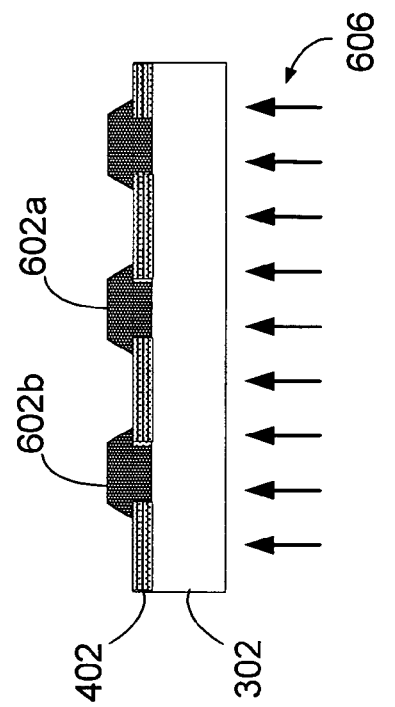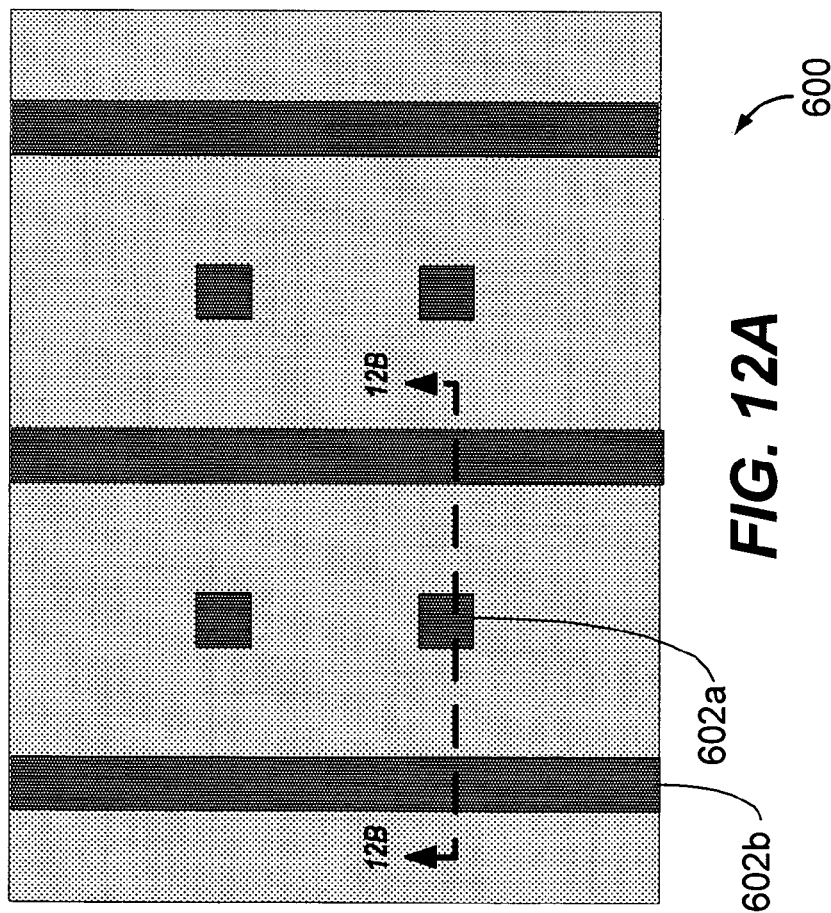
FIG. 12A
FIG. 12B
FIG. 12C

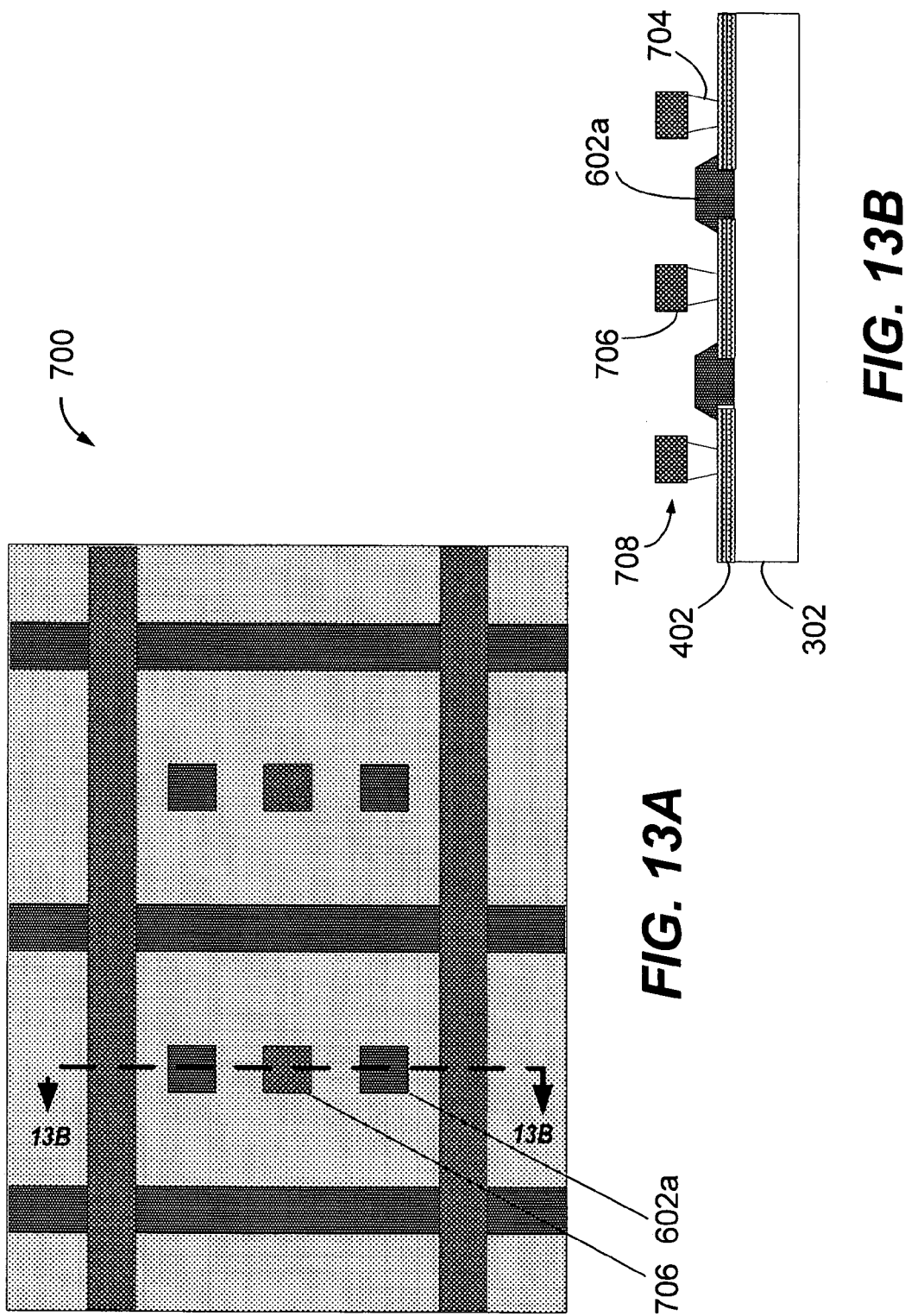

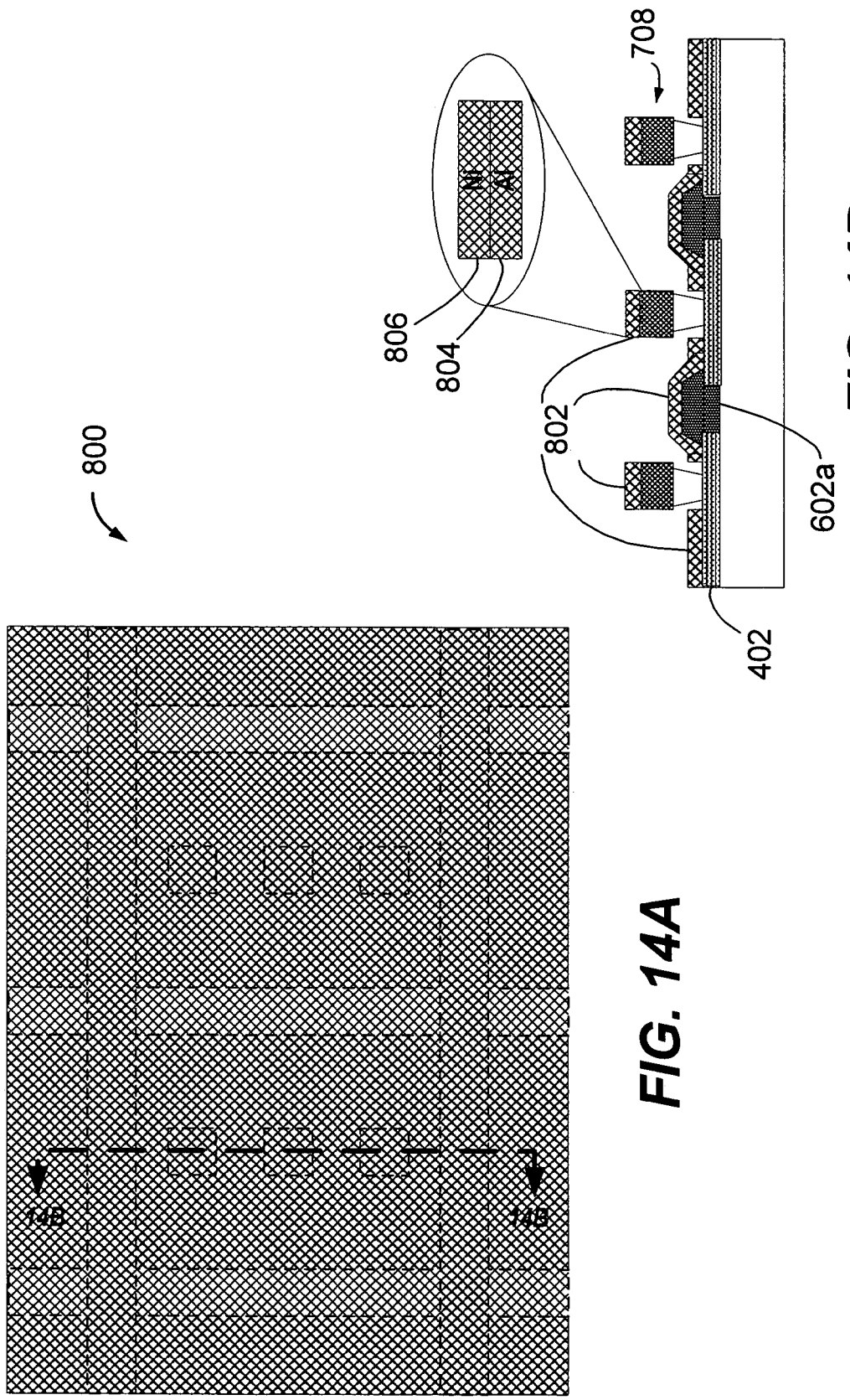

METHOD OF FABRICATING INTERFEROMETRIC DEVICES USING LIFT-OFF PROCESSING TECHNIQUES

CROSS-REFERENCE TO RELATED APPLICATION

This application claims priority to U.S. Provisional Application No. 60/613,496, filed Sep. 27, 2004, which is hereby incorporated by reference in its entirety.

BACKGROUND

1. Field of the Invention

The field of the invention relates to microelectromechanical systems (MEMS), including the field of fabricating interferometric devices. In certain embodiments, the invention relates to fabrication processing techniques usable to expand the number of acceptable materials and facilities available for fabricating interferometric devices.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The systems, methods, and devices described herein each have several aspects, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the various embodiments described herein provide advantages over other methods and display devices.

An embodiment provides a method of fabricating an interferometric modulator that includes forming an optical stack on a transparent substrate using at least a first patterning fabrication process and forming a supporting structure over the substrate. In this embodiment, the method also includes forming an upper mirror layer over the optical stack and supporting structure using at least a second pattering fabrication process, wherein a cavity is formed by at least one surface of the optical stack, the supporting structure and the upper mirror layer, where movement of a portion of the upper mirror layer into the cavity changes the optical properties perceived from a surface of the substrate in a controllable and predictable manner, and wherein at least one of the first and second fabrication processes includes a lift-off process.

Another embodiment provides a method of making an interferometric modulator that includes forming a lift-off stencil over a substrate and depositing a first material layer over the lift-off stencil and over the substrate. In this embodiment, the method further includes depositing a second material layer over the first material layer and removing the lift-off stencil to thereby form a patterned region comprising the second material layer over the first material layer.

Another embodiment provides a method of fabricating an array of interferometric modulators that includes forming a plurality of positively patterned optical stacks and a plurality of negatively patterned post regions on a substrate using a lift-off stencil and forming a plurality of post structures in the negatively patterned post regions.

Another embodiment provides a method of making a display device that includes depositing a first mirror layer, depositing a sacrificial layer over the first mirror layer, and forming a lift-off stencil over the sacrificial layer. In this embodiment, the method further includes depositing a second mirror layer over the lift-off stencil and removing the lift-off stencil, thereby forming a patterned region of the second mirror layer and exposing a portion of the sacrificial layer.

Another embodiment provides display panel that includes an array of interferometric modulators made by a method as described above. Another embodiment provides a display device that includes such a display panel, and that also includes a processor that is in electrical communication with the display panel, the processor being configured to process image data and a memory device in electrical communication with the processor.

These and other embodiments are described in greater detail below.

BRIEF DESCRIPTION OF THE DRAWINGS

These and other aspects of this invention will now be described with reference to the drawings of certain embodiments (not to scale) which are intended to illustrate and not to limit the invention.

FIGS. 9A and 9B illustrate respectively plan and cross sectional views of a partially fabricated interferometric modulator using the fabrication process embodiment of FIG. 8.

FIG. 12A illustrates a plan view, and FIGS. 12B and 12C illustrate cross sectional views, of a partially fabricated interferometric modulator using the fabrication process embodiment of FIG. 8.

FIGS. 13A and 13B illustrate respectively plan and cross sectional views of a partially fabricated interferometric modulator using the fabrication process embodiment of FIG. 8.

FIGS. 14A and 14B illustrate respectively plan and cross sectional views of a partially fabricated interferometric modulator using the fabrication process embodiment of FIG. 8.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Preferred embodiments involve the application of lift-off processing methods to the fabrication of interferometric modulators.

Figure 1:
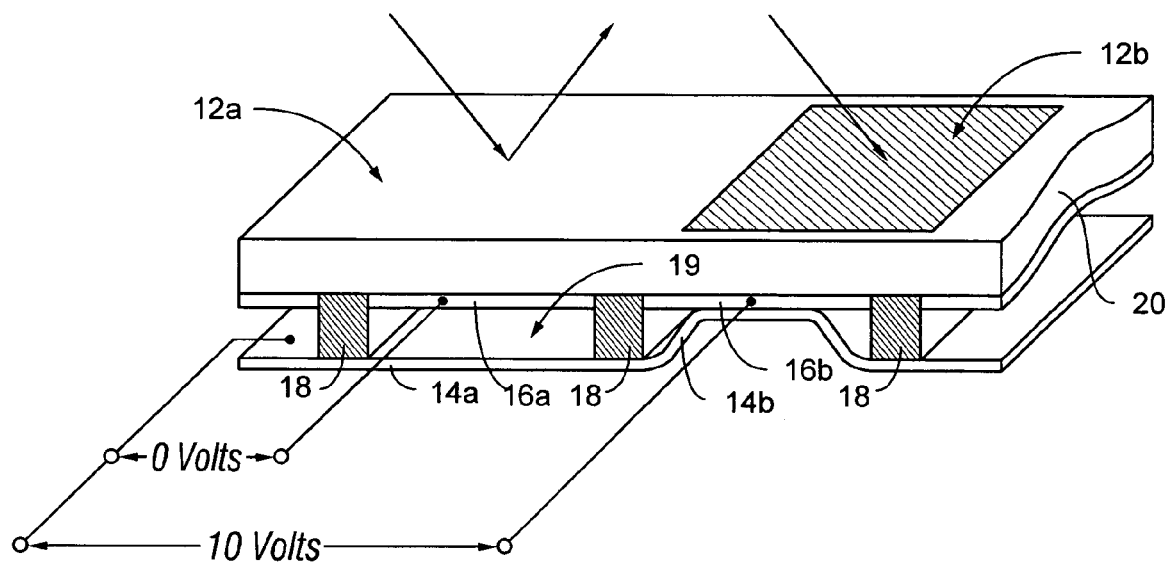
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIG.) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
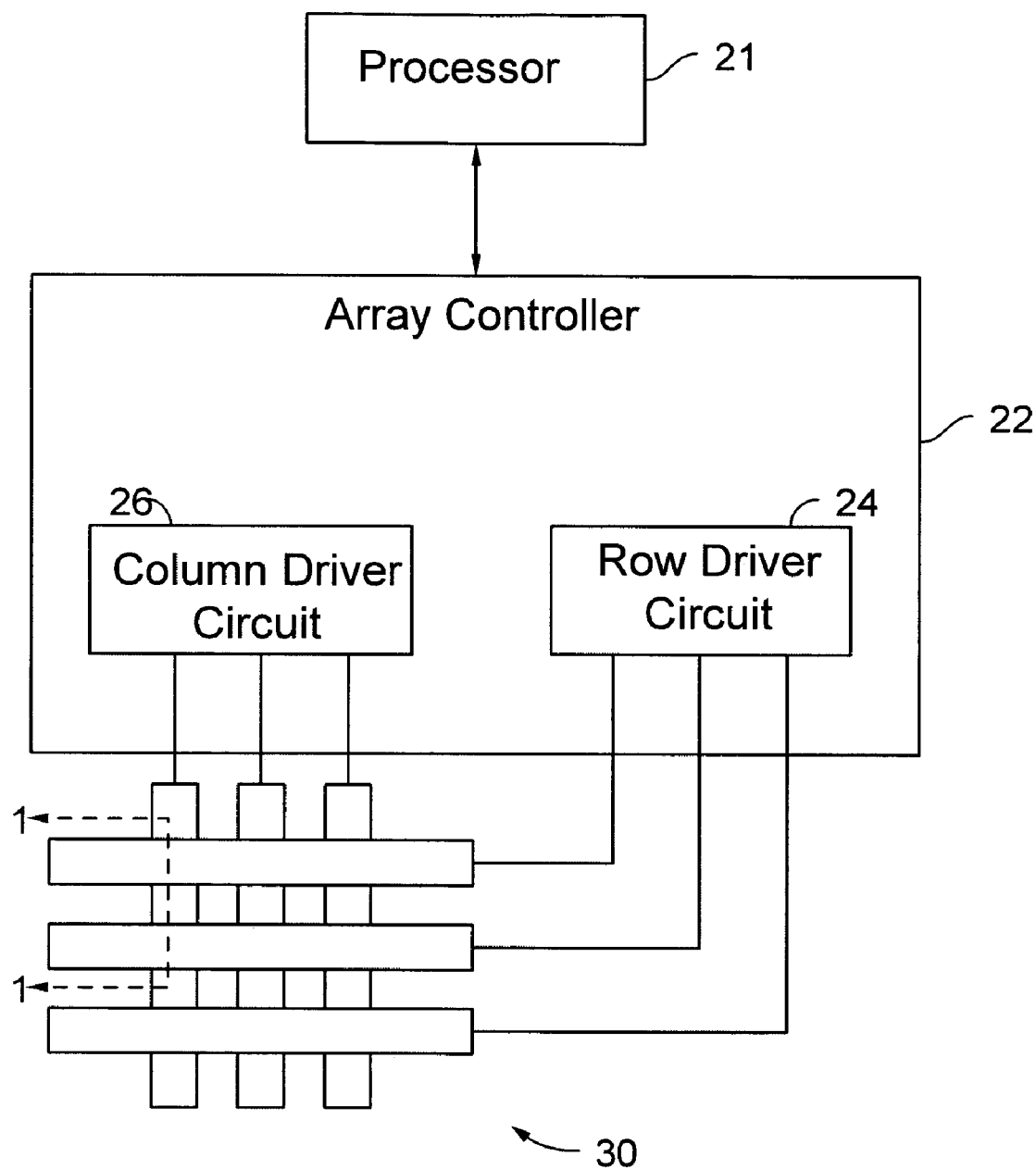
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II ®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
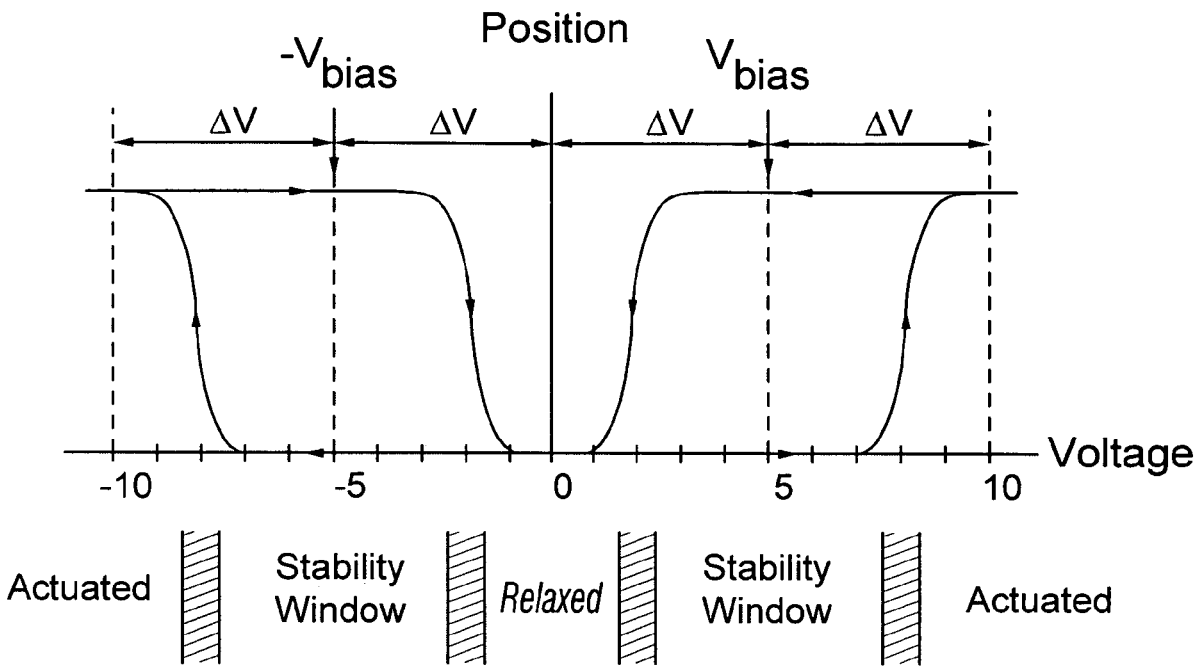
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
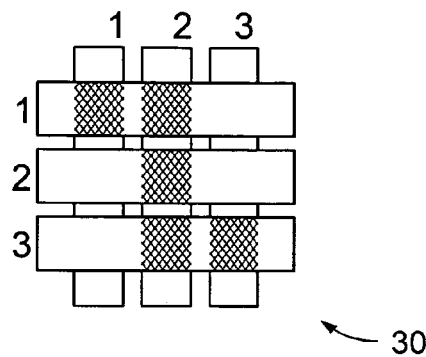
FIGS. 5A and 5B illustrate one exemplary timing diagram for row and column signals that may be used to write a frame of display data to the 3×3 interferometric modulator display of FIG. 2.
Figure 5B:
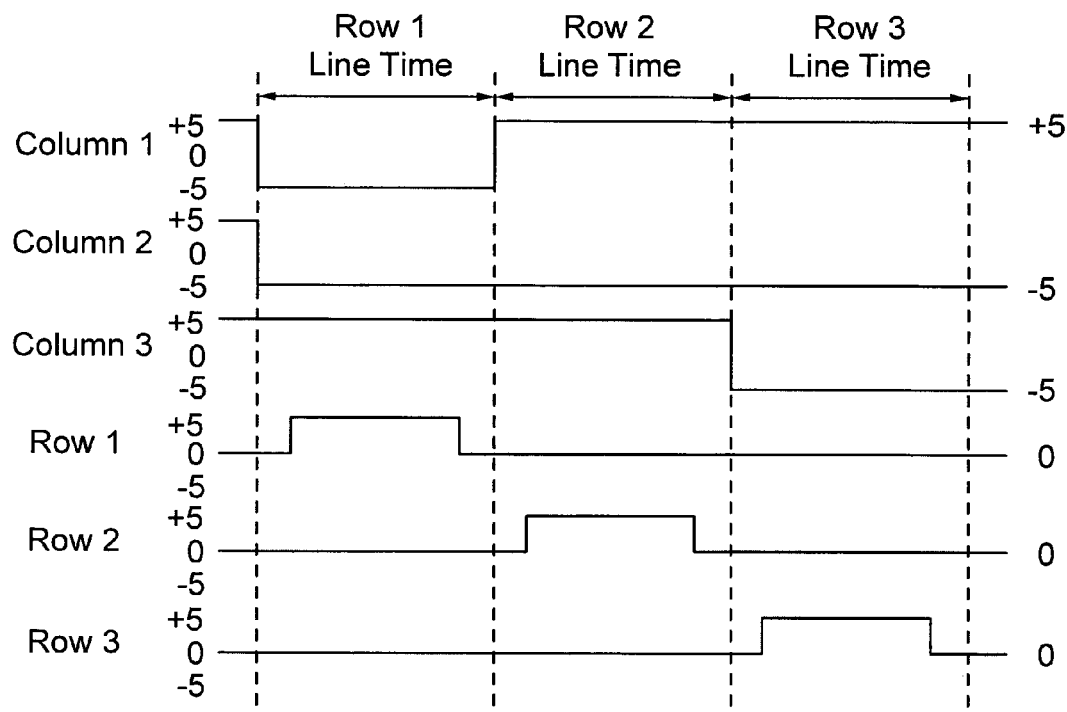

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
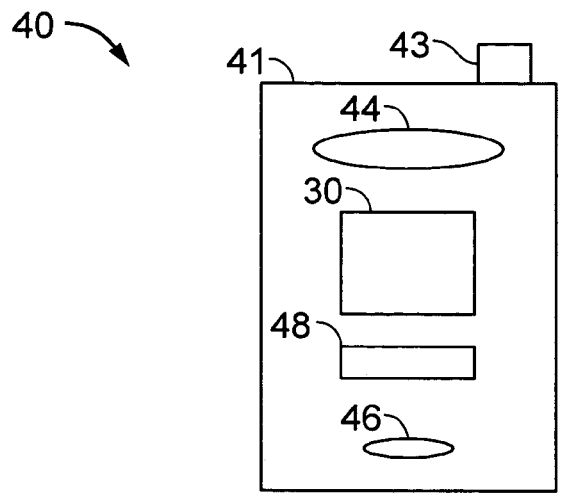
FIGS. 6A and 6B are system block diagrams illustrating an embodiment of a visual display device comprising a plurality of interferometric modulators.
Figure 6B:
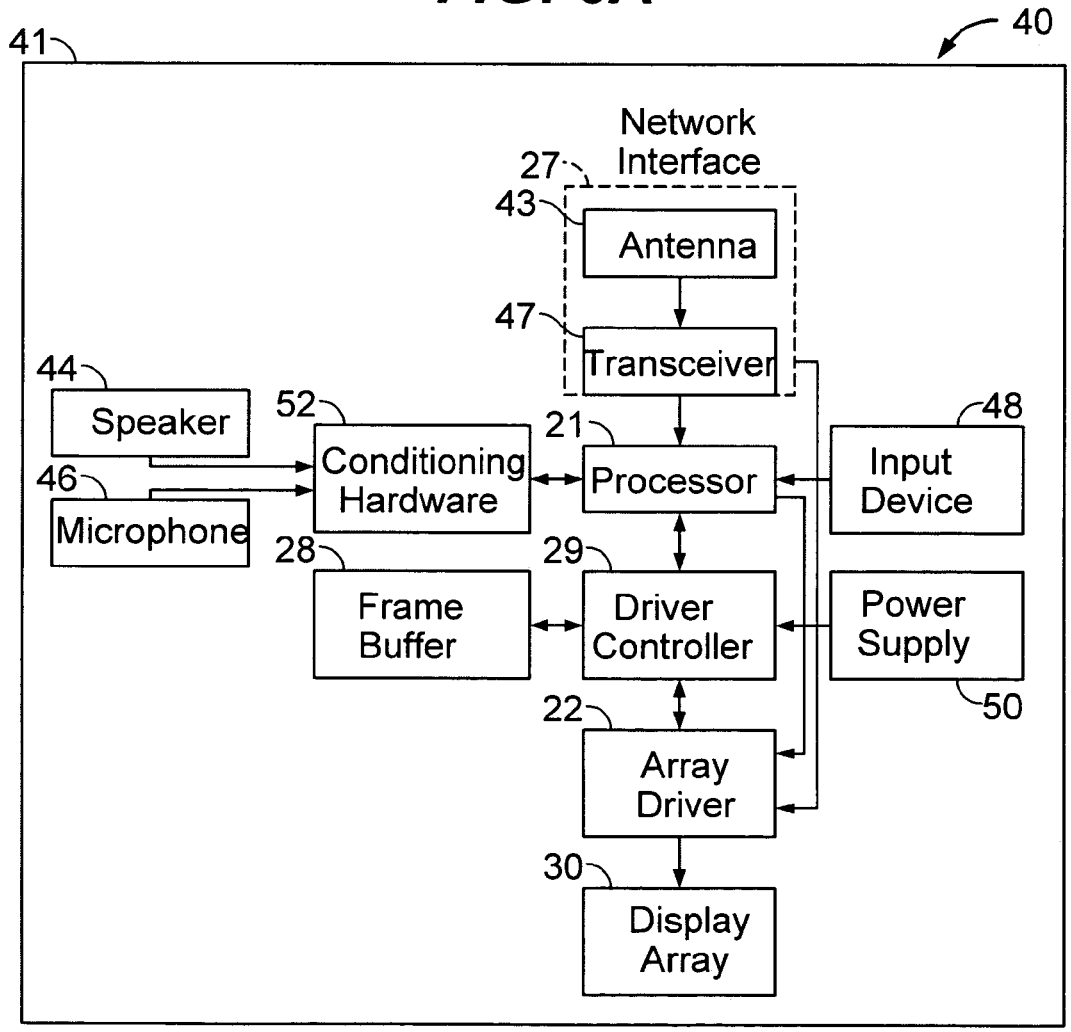

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 preprocesses the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
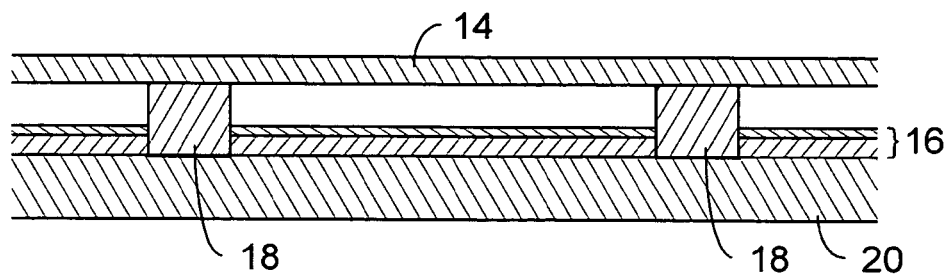
FIG. 7A is a cross section of the device of FIG. 1.
Figure 7B:
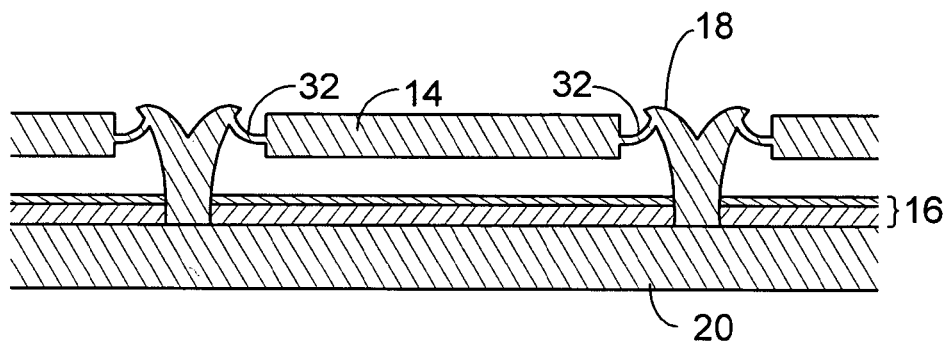
FIG. 7B is a cross section of an alternative embodiment of an interferometric modulator.
Figure 7C:
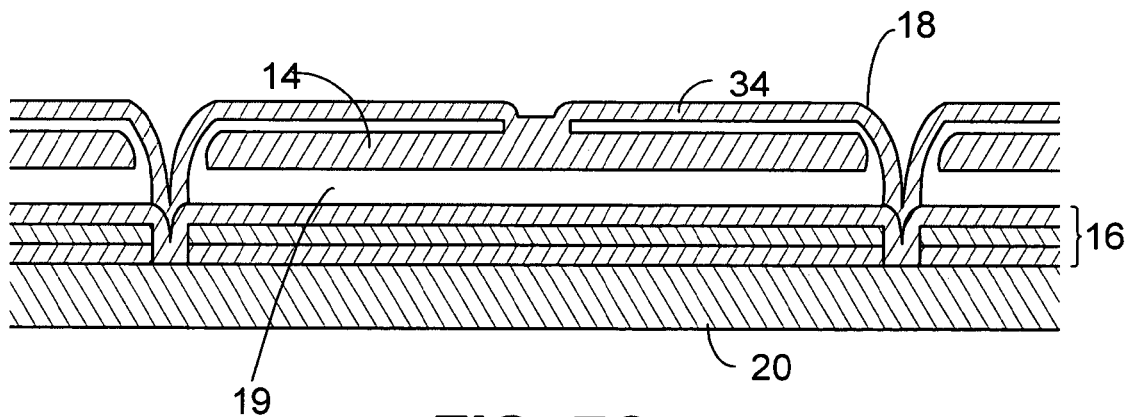
FIG. 7C is a cross section of another alternative embodiment of an interferometric modulator.
Figure 7D:
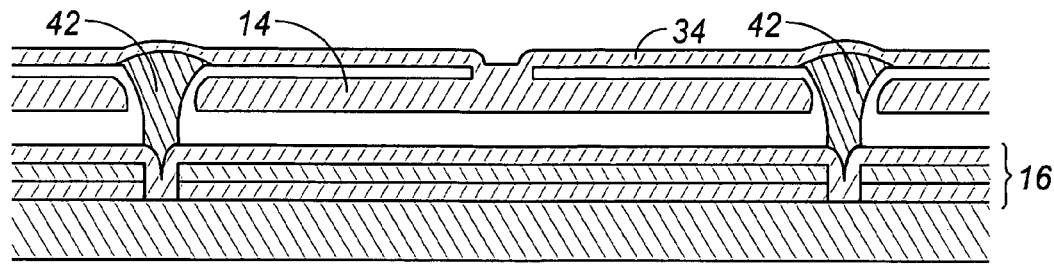
FIG. 7D is a cross section of yet another alternative embodiment of an interferometric modulator.
Figure 7E:
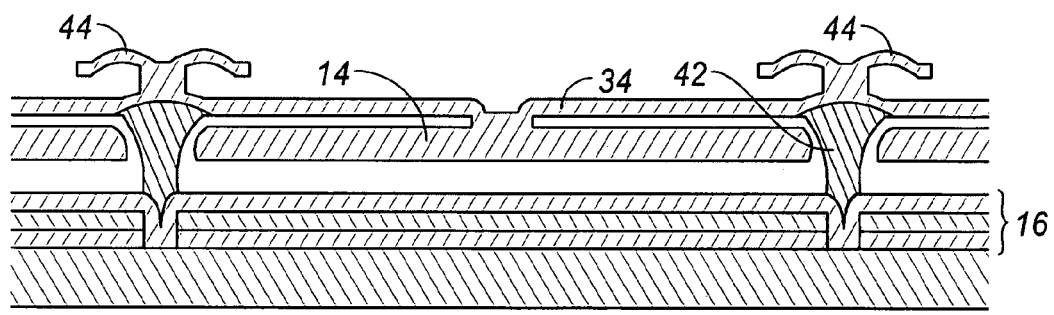
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It is noteworthy that while interferometric modulators (such as the interferometric modulators 12a and 12b) are generally optical devices, the industry employs general semiconductor fabrication techniques in its manufacturing processes. Thus, certain desired metals or other material layers may be considered "exotic" for many material removal techniques, often corresponding to use of many exotic, or at least differing, chemistries. In some cases, introduction of new removal chemistries corresponding to one or more desired exotic or other materials can cause negative chain reactions in the fabrication processes, or may simply be unavailable at many semiconductor fabrication facilities.

Accordingly, embodiments of the present disclosure include a method of fabricating interferometric devices using lift-off processing techniques. The term "lift-off processing" includes its broad ordinary and customary meaning, including fabrication processes resulting in the definition of a pattern on a substrate surface (without requiring etching of the material to remain in the product), as may be generally used to pattern geometry of hard-to-etch metals such as gold. In lift-off processing, materials are deposited over a patterned underlying material (such as a photoresist) and then lifted off in selected areas by dissolving the underlying material. The patterned underlying material formed during lift-off processing may be referred to herein as a lift-off pattern or as a lift-off stencil.

According to an embodiment, use of lift-off processing in the fabrication of various layers of interferometric modulators, such as the optical stack of FIG. 1 layers 16a, 16b and/or the movable layers 14a, 14b of the interferometric modulator interferometric modulators 12a and 12b, respectively, advantageously avoids individualized chemistries associated with the deposition and pattern definitions of materials associated with each layer thereof. Use of lift-off processing may also reduce the number of fabrication steps, thereby creating efficiencies in costs and often fabrication complexities. Moreover, use of lift-off processing may allow much greater flexibility in the selection of both materials and facilities available for fabrication of interferometric modulators.

Figure 8:
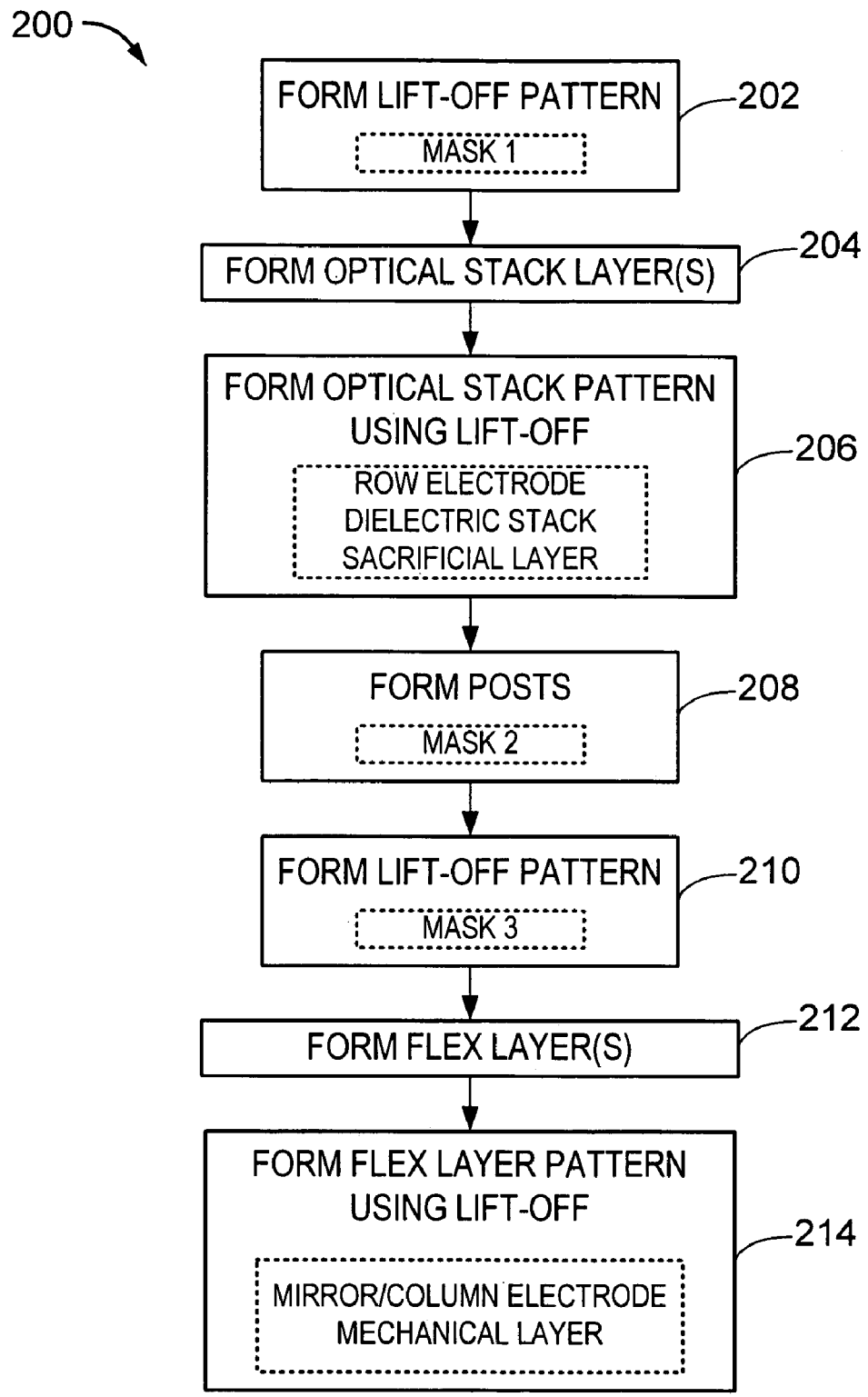
FIG. 8 illustrates an exemplary flow chart of a fabrication process for fabricating interferometric modulators, such as the modulator of FIG. 1, according to an embodiment.

FIG. 8 illustrates an exemplary flow chart of a fabrication process 200 for fabricating at least a portion of an interferometric modulator, such as, for example, the interferometric modulators 12a and 12b of FIG. 1. As shown in FIG. 8, the fabrication process 200 includes Block 202, where a lift-off pattern is formed above a preferably clean transparent substrate assembly, commercially available from a wide variety of vendors. The substrate is glass in the illustrated embodiment, but other substrates such as plastic may also be used. In an embodiment, the lift-off pattern is formed by depositing a first lift-off material, such as a polyimide release layer (PiRL), which may or may not be photo-patternable. The deposited first lift-off material is then covered with a photoresist. The photoresist provides a pattern geometry, and the first lift-off material and the photoresist are patterned accordingly to form a lift-off stencil. Processing technology using a PiRL layer patterned by use of an additional photoresist layer is commercially available from, for example, Brewer Science, Inc. of Rolla, Mo. However, an artisan will recognize from the disclosure herein that other lift-off materials can be used. For example, the lift-off pattern may advantageously be formed using a single layer of patternable lift-off material such as those commercially available from Futurex Corporation. The thickness of the lift-off stencil is preferably greater than the layers subsequently deposited over the lift-off stencil, to facilitate solvent access and subsequent removal of the lift-off stencil. For example, in some embodiments, the thickness of the lift-off stencil is in the range of from about 1,500 Å to about 50,000 Å, and in certain embodiments may be in the range of from about 20,000 Å to about 30,000 Å.

The fabrication process 200 also includes Block 204, where optical stack layers are formed. In an embodiment, the optical stack layers are formed by depositing one or more material layers over a substrate assembly and over the lift-off stencil. Lift-off processing may be used to separately form each of the individual layers in the optical stack or, preferably, may be used to form multiple layers within the optical stack. For example, in the illustrated embodiment, the optical stack includes a conductor layer, a lower mirror metal layer, and a dielectric layer. Additional material layers may be deposited over the optical stack. For example, in the illustrated embodiment, a sacrificial layer is deposited over the optical stack and later subjected to lift-off processing along with the optical stack. The thicknesses of each of the layers (e.g., the optical stack layers and the sacrificial layer) in the overall stack may be the same as or, as illustrated below, different from one another.

In an embodiment, the conductor layer is a substantially transparent material, preferably comprising indium tin oxide (ITO). The thickness of the transparent conductor layer is typically selected by taking into consideration the conductivity specifications for the rows in the display, the optical transmission qualities of the material, etc. In a preferred embodiment, the thickness of the transparent conductor layer is in the range of about 200 angstroms (Å) to about 1000 Å. For example, in the illustrated embodiment, the transparent conductor layer has a thickness of about 500 Å. An artisan will recognize from the disclosure herein that other materials can advantageously be used to fabricate the conductor layer, including zinc oxide.

In an embodiment, the lower mirror metal layer comprises a chromium (Cr) layer. The thickness of the lower mirror layer is typically selected by taking into consideration the optical transparency or other optical characteristics of the material. Accordingly, in a preferred embodiment, the thickness of the mirror layer is such as to render it partially transmissive, preferably in the range of about 30 Å to about 150 Å. For example, in the illustrated embodiment, the mirror layer has a thickness of about 70 Å. Thus, in this embodiment, the ITO transparent conductor layer has a thickness (about 500 Å) that is greater than a thickness of the chromium mirror layer (about 70 Å). An artisan will recognize from the disclosure herein that the lower mirror metal layer may comprise other materials in addition to or instead of Cr, including molybdenum (Mo), titanium (Ti), and/or tungsten (W).

In an embodiment, the dielectric layer comprises a silicon dioxide ($SiO_2$) layer. The thickness of the dielectric layer is typically selected by taking into consideration the desired color of the modulator in the biased position. Accordingly, in a preferred embodiment, the thickness of the dielectric layer is in the range of about 100 Å to about 2,500 Å. For example, in the illustrated embodiment, the dielectric layer has a thickness of about 700 Å. An artisan will recognize from the disclosure herein that the dielectric layer may include multiple sublayers, in which case it may be referred to as a dielectric stack. The dielectric layer may include various dielectric materials, such as silicon nitride (SiN), aluminum oxide ($Al_2O_3$), and silicon oxides ($SiO_x$), each singly or in combination (e.g., in sublayers).

The sacrificial layer comprises a molybdenum (Mo) layer in the illustrated embodiment. The thickness of the sacrificial layer is typically selected by taking into consideration the desired color of the modulator in the unactuated position, and by taking into consideration the fabrication process (e.g., dry etch) used to remove the sacrificial layer, as will be discussed herein below. In a preferred embodiment, the thickness of the sacrificial layer is in the range of about 400 Å to about 6,000 Å. For example, in the illustrated embodiment, the sacrificial layer has a thickness of about 2,000 Å. An artisan will recognize from the disclosure herein that the sacrificial layer may include, in addition to or instead of molybdenum, one or more other readily removable materials such as silicon (Si), titanium (Ti), tungsten (W), and germanium (G).

The skilled artisan will recognize from the disclosure herein that some or all of the foregoing optical stack layers may be chosen at least in part for their adhesion to the substantially transparent substrate and/or in view of the potential for debris remaining after a the lift-off pattern is formed. Moreover, the optical stack layers may advantageously be chosen from materials that can be deposited at temperatures that do not substantially negatively affect the organic lift-off structures. For example, in one embodiment, the materials of the optical stack are deposited at a temperature of about 250° C. or less.

The fabrication process 200 also includes Block 206, where the optical stack is patterned using a lift-off process. As is generally understood in the art from the disclosure herein, the lift-off process comprises the use of a chemistry which reacts with and/or dissolves some or all of the lift-off materials forming the lift-off stencil under, for example, the optical stack layers. By removing the lift-off materials, the materials of the optical stack layer(s) above the lift-off materials are no longer attached, and float or "lift" off the substrate assembly with the waste chemistry. Other layers formed over the optical stack, e.g., a sacrificial layer, may be lifted-off along with the optical stack. Thus, the lift-off process advantageously provides for the patterning of a plurality of differing and possibly exotic layers using a known chemistry. Removal of the lift-off materials may be accomplished in various ways. For example, the lift-off materials may be exposed to a liquid, gaseous or vaporous lift-off chemistry that reacts with and/or dissolves the lift-off materials, followed by rinsing to remove the materials that are no longer attached. Lift-off chemistry is preferably applied in liquid form, which may be referred to herein as a wet etch lift-off.

In a preferred embodiment, the remaining patterned layer (s) form a row electrode, an optical stack and a sacrificial layer of a modulator such as the interferometric modulators 12a and 12b.

The fabrication process 200 also includes Block 208, where supporting structures, such as the posts 18 are formed. For example, in the illustrated embodiment, the material of the posts 18 comprises a positive or negative photoresist that may or may not be patternable. In one embodiment, a topside photoresist is deposited and an appropriately aligned reticle is used to pattern the material from the topside. A planarization technique, such as a chemical mechanical planarization (CMP) may be used to remove extra photoresist and/or material. In an alternative embodiment, a backside photoresist may be patterned using backside exposure (the substrate assembly is preferably transparent) and the optical stack pattern advantageously forms the appropriate alignment (mask). In this embodiment, a CMP may also be used to remove extra photoresist and/or material.

The skilled artisan will recognize from the disclosure herein that specific CMP processes may be used to modify or improve the shape of the planarized resist structures. Further, an artisan will recognize from the disclosure herein that other materials can advantageously be used for some or all of the posts, including spin-on glass (SOG), organic planarization materials, etc. An artisan will also recognize from the disclosure herein that use of some materials or processes may reduce or eliminate the CMP process altogether. For example, a spin-on glass may be patterned and simply left without leveling. Such processing may leave bumps but often does not substantively alter the operation or reliability of the device.

The fabrication process 200 also includes Block 210, where a second lift-off pattern is formed. The lift-off materials used may be the same or different from the materials discussed above with reference to Block 202 and the formation of the first lift-off pattern. An artisan will recognize from the disclosure herein that the lift-off materials may be chosen to ensure alignment with the row electrode layer and/or to increase the cleanliness of the optical stack after the lift-off pattern is formed.

The fabrication process 200 also includes Block 212, where one or more flex layers are formed. In an embodiment, the flex layers are formed by depositing one or more layers over the partially fabricated modulator and the lift-off materials. According to one embodiment, the flex layers comprise a mirror layer and a flexible metal conductor layer. In an embodiment, the mirror layer comprises an aluminum (Al) layer. The thickness of the mirror layer is typically selected by taking into consideration the reflectivity of the material and the material's structural integrity, e.g., the materials may be freestanding and should be sufficiently thick to survive the stresses of the fabrication processing steps and normal operation. Furthermore, the mirror layer is preferably thick enough to be fully reflective in the exemplary embodiment. In an embodiment, the thickness of the mirror layer is in the range of about 80 Å to about 1 Micron. For example, in the illustrated embodiment, the mirror layer has a thickness of about 300 Å. An artisan will recognize from the disclosure herein that the mirror layer may include, in addition to or instead of aluminum, one or more other reflective materials such as silver (Ag) or gold (Au). The flex layer may be conductive, reflective and/or flexible, and thus, for example, a single structure may function as an electrode layer, a mirror layer and a deformable layer. In some embodiments, e.g., as illustrated in FIG. 7C, the reflective layer 14 is suspended from the deformable layer 34, both of which may function as electrode layers. Various other configurations may also be employed.

In an embodiment, the flexible metal conductor layer in the flex layer comprises a nickel (Ni) layer. The thickness of the conductor layer is typically selected by taking into consideration the material's structural integrity and its ability to withstand the fabrication processing steps. In an embodiment, the thickness of the flexible metal conductor layer is in the range of about 300 Å to about 1 Micron. For example, in the illustrated embodiment, the conductor layer in the flex layer has a thickness of about 1000 Å. An artisan will recognize from the disclosure herein that the conductor layer may include, in addition to or instead of nickel, one or more other conductive materials such as chromium, aluminum, and/or an aluminum alloy. The conductor layer may include a composite structure such as a metal oxide sandwich.

The skilled artisan will recognize from the disclosure herein that some or all of the foregoing flex layer(s) may be chosen at least in part for their adhesion (or lack of adhesion) to the optical stack layer(s) and/or for their adhesion to the supporting structures or post layer. For example, with reference to FIG. 1, the materials of the flex layer 14b are preferably selected to minimize adhesion to the fixed partially reflective layer 16b during actuation of the of the interferometric modulator 12b. In addition, the materials of the flex layers may be chosen for the adhesion to one another, e.g., to maximize adhesion between the conductor layer and the mirror layer.

The fabrication process 200 also includes Block 214, where the flex layer is patterned using a lift-off process. In a preferred embodiment, the remaining patterned flex layer(s) form a second mirror, a column electrode and a mechanical layer of an interferometric modulator such as interferometric modulators 12a and 12b. The flex layer may be patterned separately from the mirror layer, e.g., to form a configuration such as that illustrated in FIG. 7C. Lift-off processing may be used to advantageously facilitate patterning of relatively thick mirror layers. The flex layer is preferably highly conductive and in tensile stress. The flex layer preferably has the internal material integrity to withstand the stresses of the fabrication process and adhere to the planarization materials.

In an embodiment, removal of the lift-off stencil preferably forms a patterned region second mirror and exposes a portion of the underlying sacrificial layer as illustrated in FIGS. 14-15 (discussed below). The lift-off processing illustrated in this embodiment advantageously allows for portions of the flex layer to be removed without etching the deposited materials of interest for the final structure (in this example, without directly etching the flex layer). It has been found that conventional etch removal of such portions of the flex layer may also result in undesired premature etching of the underlying sacrificial layer. the flex layer may also result in undesired premature etching of the underlying sacrificial layer.

The skilled artisan will recognize from the disclosure herein that various additional processing steps may advantageously remove the sacrificial layer to form a cavity, e.g., the cavity 19 in interferometric modulator 12a (FIG. 1). Moreover, based on the foregoing, the skilled artisan will recognize from the disclosure herein that through the use of lift-off processing, the fabrication process 200 may be used to advantageously avoid etch compatibility issues and differing and exotic chemistry issues, while advantageously consolidating pattern forming throughout the fabrication process, particularly during fabrication of the optical stack as described above. The fabrication process 200 may also be used to advantageously reduce processing steps and increase the availability and selection of layer materials and fabrication facilities for the modulator manufacturer.

FIGS. 9A and 9B illustrate respectively plan and cross sectional views of a partially fabricated interferometric modulator 300, according to an embodiment. As shown, the modulator 300 includes a transparent substrate assembly 302, patterned lift-off materials PiRL 304 and photoresist 306, which together form lift-off stencil 308. As shown in FIG. 9B, the lift-off materials may advantageously form an upside-down trapezoidal or rough letter "T" shape by selectively over-etching the PiRL material 304. The T-shape may help to facilitate lift-off because materials deposited on the upper portion of the T-shape are separated from materials deposited on the substrate near the base of the T-shape. The T-shape may also facilitate exposure of the lift-off stencil 308 to the lift-off chemistry. A described in greater detail below, a post 602*a* will later be formed in a region 312 and a rail 602*b* (separating lower electrodes from each other) will later be formed in a region 310 as indicated in FIG. 9A.

Figure 10B:
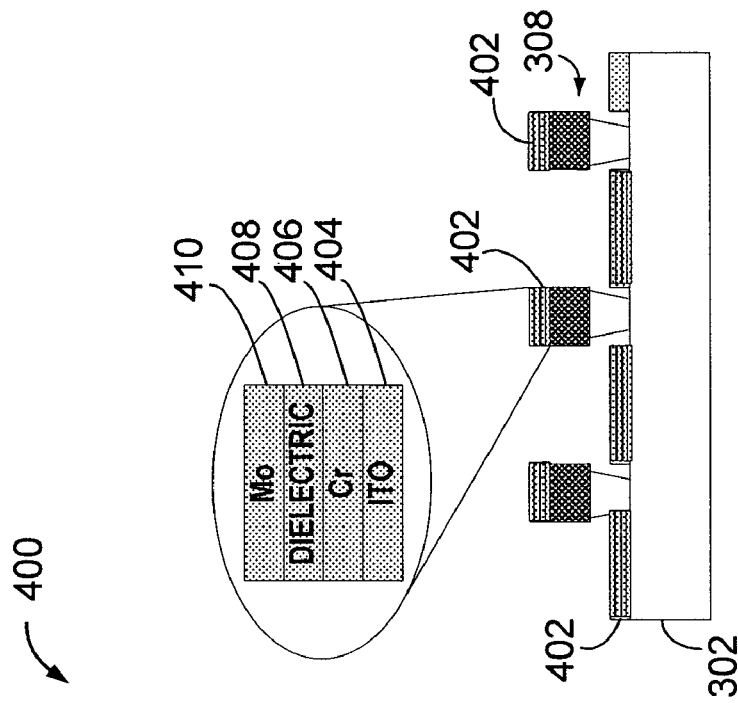
FIGS. 10A and 10B illustrate respectively plan and cross sectional views of a partially fabricated interferometric modulator using the fabrication process embodiment of FIG. 8.
Figure 10A:
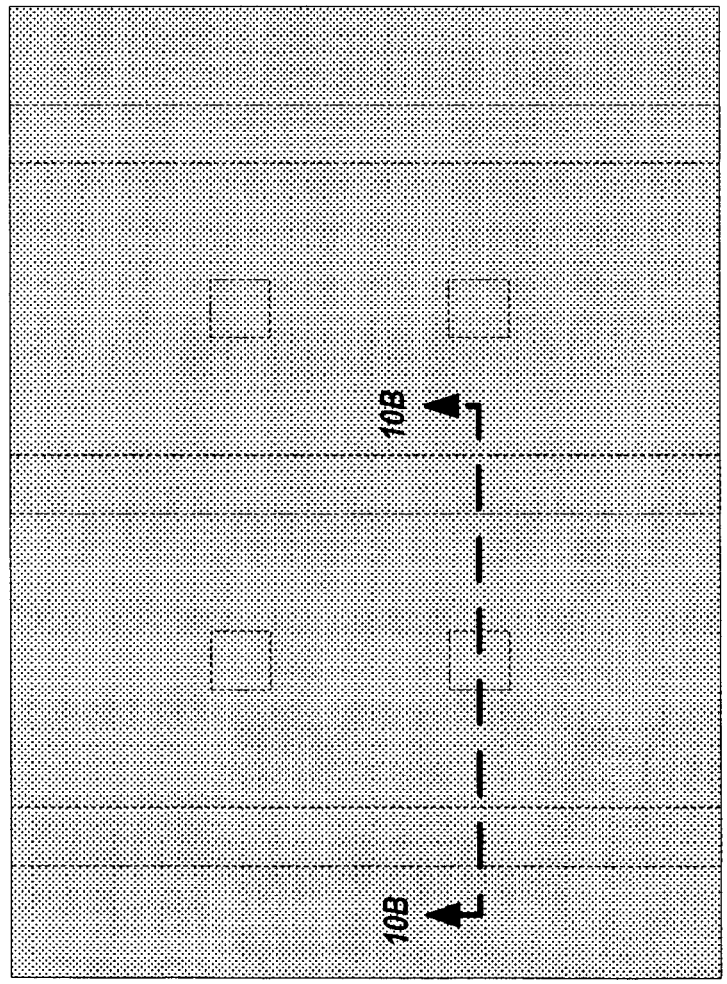

FIGS. 10A and 10B illustrate respectively plan and cross sectional views of a partially fabricated interferometric modulator 400, according to an embodiment. As shown, the modulator 400 includes a stack 402 formed over both the lift-off stencil 308 and the substrate 302. As shown in FIG. 10B, the stack 402 comprises multiple material layers, including the ITO layer 404, the Cr layer 406, the dielectric layer 408, and the sacrificial Mo layer 410. As discussed below with respect to FIG. 15, the ITO layer 404, the Cr layer 406 and the dielectric layer 408 are ultimately incorporated into an optical stack 906. As mentioned above, the thickness of the lift-off stencil 308 is preferably greater than the thickness of the stack 402, to facilitate lateral access for the chemistry later used to remove the lift-off stencil 308.

Figure 11B:
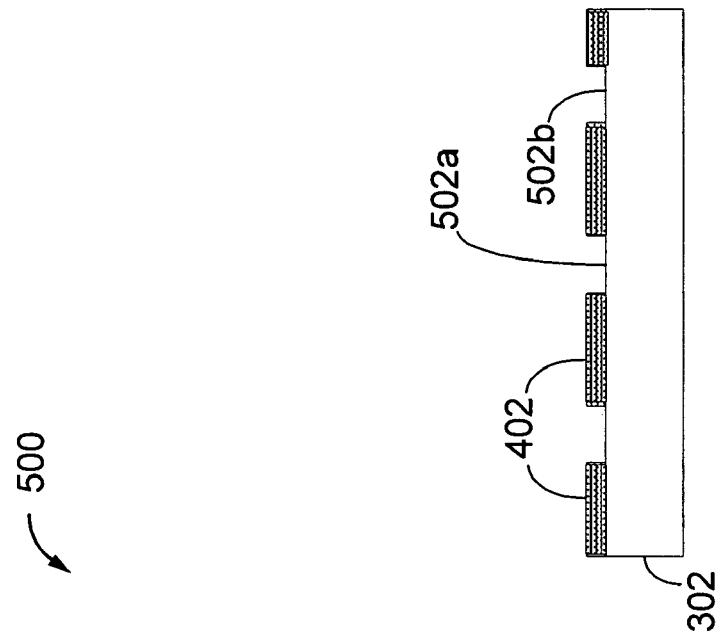
FIGS. 11A and 11B illustrate respectively plan and cross sectional views of a partially fabricated interferometric modulator using the fabrication process embodiment of FIG. 8.
Figure 11A:
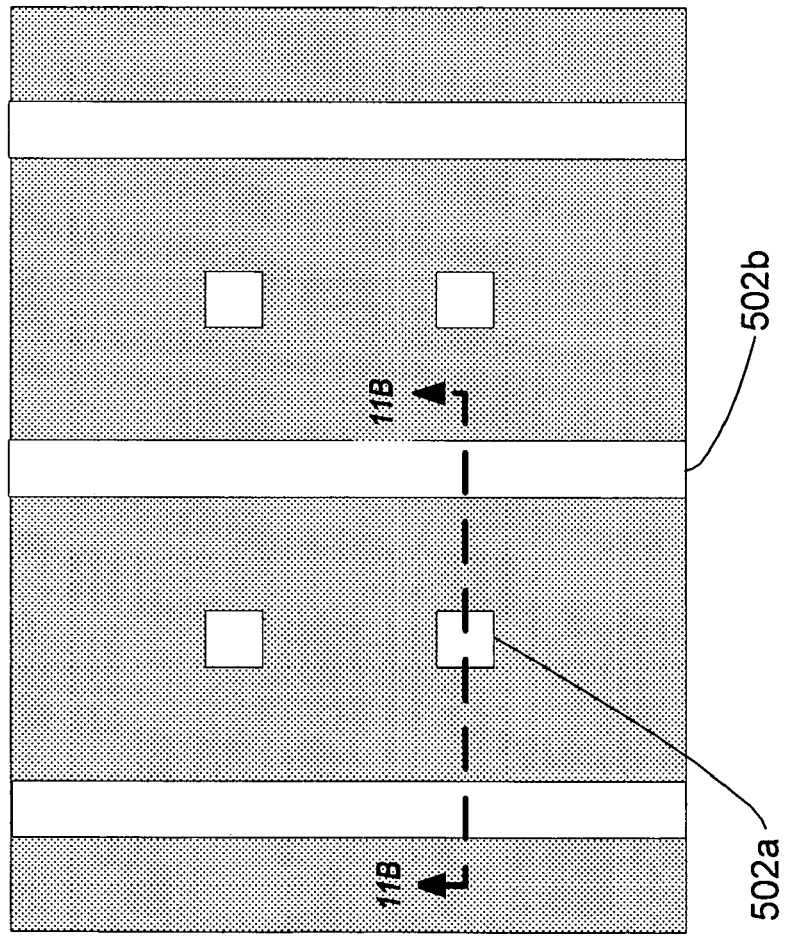

FIGS. 11A and 11B illustrate respectively plan and cross sectional views of a partially fabricated interferometric modulator 500, according to an embodiment. As shown, the modulator 500 includes the patterned stack 402 after the lift-off process has occurred, during which the lift-off stencil 308 was removed (along with the portions of the stack 402 deposited on the lift-off stencil 308 as shown in FIG. 10B). The patterned stack 402 includes the underlying optical stack 404-408 (FIG. 10B). The optical stack 404-408 (along with the overlying sacrificial layer 410) is positively patterned in the sense it is formed from materials that remain after lift-off. The modulator 500 also includes negatively patterned regions 502*a*, 502*b* on the substrate 302, formed by the removal of the lift-off stencil 308.

FIG. 12A illustrates a plan view, and FIGS. 12B and 12C illustrate cross sectional views, of a partially fabricated interferometric modulator 600, according to an embodiment. As shown, the modulator 600 includes the supporting structures 602*a* (post) and 602*b* (rail), formed through a reticle 604 by exposure to radiation 606 using a front-side alignment exposure technique (FIG. 12B), or a backside self-aligned exposure technique (FIG. 12C). The post 602*a* and rail 602*b* structures are formed in the negatively patterned regions 502*a*, 502*b* on the substrate 302, respectively (FIGS. 11A and 11B).

It has been found that the use of lift-off processing to form negatively patterned regions may be advantageous as compared to directly etching the material to be patterned, particularly for the removal of thick layers. For example, negatively patterned regions formed by direct etching processes tend to be somewhat larger than the size of the overlying pattern material (e.g., photoresist) because of the tendency for the etchant to undercut the pattern material. In an embodiment in which it is desirable for the post structures to occupy a minimum amount of space, use of lift-off processing facilitates the formation of desirably small negatively patterned regions over which post structures may be formed. Thus, in a preferred embodiment, lift-off processing is used to form negatively patterned regions during the fabrication of an interferometric modulator, more preferably to form negatively patterned regions into which post structures are later formed. In a number of embodiments, wet-etch lift-off processing is particularly advantageous as compared to direct etching (wet and/or dry) for the formation of negatively patterned regions during the fabrication of interferometric modulators.

It has also been found that the use of lift-off processing may be advantageous for removing multiple material layers as compared to direct etching processes, and particularly for the removal of relatively thick layers that underlie relatively thin layers. Because different materials tend to direct etch at different rates, the use of isotropic etchants to remove multiple layers often results in irregular sidewalls because of differing lateral etching rates for the different materials in the various layers. For example, wet etching of a stack that includes a thin chromium layer over a thicker ITO layer may result in undercutting of the chromium layer because the exposure to the etchant used to remove the ITO layer may be relatively long in order to achieve the desired degree of etching of the thicker ITO layer. Thus, in a preferred embodiment, lift-off processing is used during the fabrication of an interferometric modulator to remove multiple material layers. In a number of embodiments, wet-etch lift-off processing is particularly advantageous as compared to direct wet etching for the removal of multiple material layers during the fabrication of interferometric modulators.

FIGS. 13A and 13B illustrate respectively plan and cross sectional views of a partially fabricated interferometric modulator 700, according to an embodiment. It is to be noted that the cross-sectional view 13B is along a different line than illustrated in FIG. 12B. As shown, the modulator 700 includes patterned lift-off materials PiRL 704 and photoresist 706, which together form a lift-off stencil 708. As shown in FIG. 13B, the lift-off stencil 708 is formed in a rough T-shape over the stack 402 in a manner similar to that described above for the formation of the lift-off stencil 308.

FIGS. 14A and 14B illustrate respectively plan and cross sectional views of a partially fabricated interferometric modulator 800, according to an embodiment. As shown, the modulator 800 includes a flex layer 802 formed over the stack 402, the lift-off stencil 708, and the posts 602*a*. As shown in FIG. 14B, the flex layer 802 may advantageously comprise an Al mirror layer 804 and a Ni conductor layer 806. The Al mirror layer 804 and Ni conductor layer 806 may be formed in various ways, e.g., by physical vapor deposition or sputter deposition.

Figure 15A:
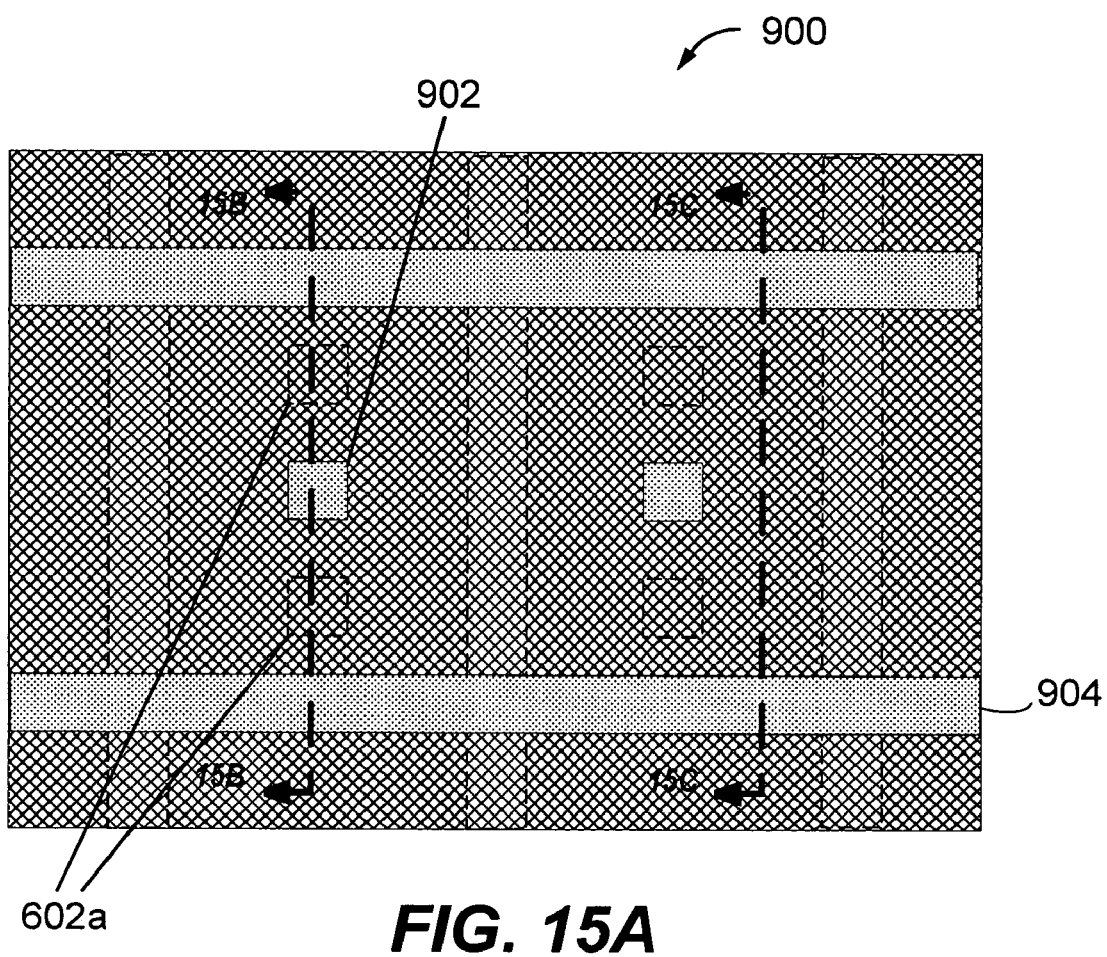
FIG. 15A illustrates a plan view of a partially fabricated interferometric modulator using the fabrication process embodiment of FIG. 8.
Figure 15B:
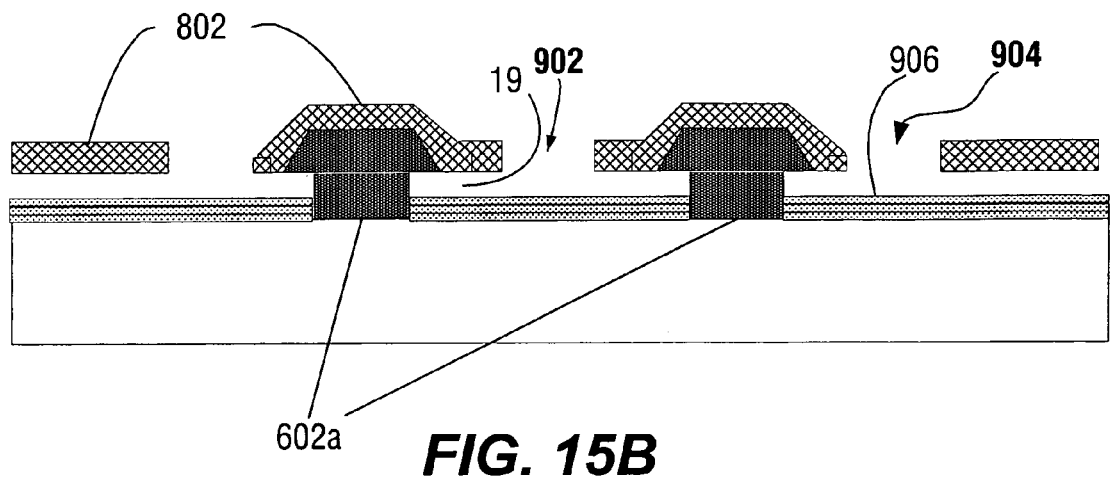
FIGS. 15B and 15C illustrate cross sectional views of the partially fabricated interferometric modulator of FIG. 15A.
Figure 15C:
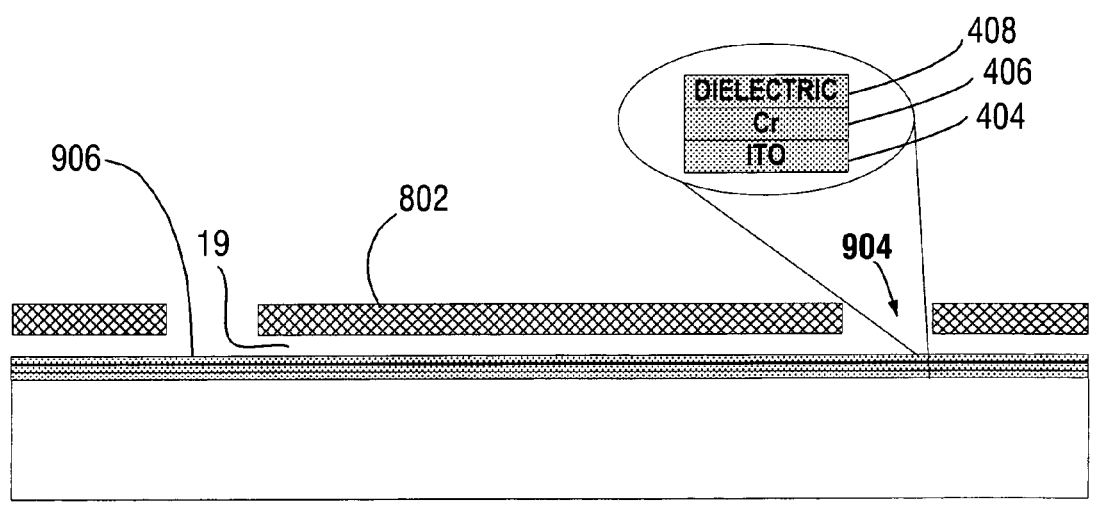

FIG. 15A illustrates a plan view, and FIGS. 15B and 15C illustrate cross sectional views, of an interferometric modulator 900, according to an embodiment. As shown, the modulator 900 includes patterned flex layer 802 (including Al mirror layer 804 and Ni conductor layer 806) after the lift-off process has occurred, during which the lift-off stencil 708 was removed (along with the portions of the flex layer 802 deposited on the lift-off stencil 708 as shown in FIG. 14B). Removal of the lift-off stencil 708 results in the formation of apertures 902, 904. FIGS. 15B and 15C also illustrate the post-processing removal of the sacrificial layer 410 from the stack 402, forming an optical stack 906 that includes the ITO layer 404, the Cr layer 406, and the dielectric layer 408. Removal of the sacrificial layer 410 also results in the formation of a cavity 19 of the modulator 900. The posts 602*a* are supporting structures for the patterned flex layer 802 and also serve to define the cavity 19. In an embodiment, removal is accomplished by exposing the modulator 800 to xenon fluoride ($XeF_2$), which flows through the apertures 902, 904 to chemically react with the Mo sacrificial layer 410, causing the sacrificial layer to be removed by a dry etching process and thereby forming the cavity 19.

Although the foregoing embodiments of the process of fabricating an interferometric modulator have been described in terms of certain preferred embodiments, other embodiments will be apparent to those of ordinary skill in the art from the disclosure herein. For example, the lift-off processes can advantageously be applied to only one, some or none of the various layers of the optical stack or flex layer. Moreover, various interferometric device structures and shapes may also be formed using the above described lift-off processes. For example, the mirror function may advantageously be separated from the mechanical or flexible function of the flex layer e.g., such that the substantially rigid mirror layer 14 is suspended from the mechanical layer 34 over the cavity 19 as illustrated in FIG. 7C. Suitable methods for fabricating such structures may be determined by routine experimentation and may involve, for example, a first lift-off process for the fabrication of the mirror layer 14 and a second lift-off process for the fabrication of the mechanical layer 34. The skilled artisan will also appreciate that methods described herein as being applicable to the fabrication of individual interferometric modulators are also suitable for the fabrication of arrays of interferometric modulators. Likewise, it will be understood that methods described herein as being applicable to the fabrication of arrays of interferometric modulators are also suitable for the fabrication of individual interferometric modulators.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of fabricating an interferometric modulator, comprising:

forming an optical stack on a transparent substrate using at least a first patterning fabrication process;

forming a supporting structure over the substrate; and forming an upper mirror layer over the optical stack and supporting structure using at least a second patterning fabrication process;

wherein a cavity is formed by at least one surface of the optical stack, the supporting structure and the upper mirror layer, where movement of a portion of the upper mirror layer into the cavity changes the optical properties perceived from a surface of the substrate in a controllable and predictable manner, and wherein at least one of the first and second fabrication processes comprises a lift-off process;

wherein forming the upper mirror layer over the optical stack comprises depositing a sacrificial layer between the optical stack and the upper mirror layer; and wherein the lift-off process comprises lifting off at least a portion of the optical stack along with at least a portion of the sacrificial layer.

2. The method of claim 1, wherein the optical stack comprises at least one of a conductor layer, a lower mirror metal layer, and a dielectric layer.

3. The method of claim 2, wherein the optical stack comprises a lower mirror metal layer.

4. The method of claim 3, wherein at least the lower mirror metal layer forms a row electrode.

5. The method of claim 1, further comprising removing at least a portion of the sacrificial layer to form the cavity.

6. The method of claim 1, wherein the upper mirror layer comprises a flexible metal conductor layer.

7. The method of claim 6, wherein at least the upper mirror layer forms a column electrode.

8. The method of claim 1, wherein the first and second fabrication processes comprise lift-off processes.

9. The method of claim 1, further comprising forming an imaging application.

10. The method of claim 9, wherein the imaging application comprises a flat panel display.

11. The method of claim 10, wherein the flat panel display is part of a mobile electronic device.

12. The method of claim 9, wherein the imaging application comprises at least one of a handheld computer, a personal digital assistant, a laptop computer, a mobile telephone, a handheld video gaming device, a home appliance, a television, a timepiece, a kiosk, and a automobile computing device.

13. The method of claim 1 in which the lift-off process comprises forming a generally T-shaped lift-off stencil.

14. The method of claim 1 in which the lift-off process comprises patterning a lift-off stencil.

15. The method of claim 14 in which the patterning of the lift-off stencil comprises depositing a photoresist over a polymer.

16. The method of claim 1 in which the lift-off process comprises wet etching to remove a lift-off stencil.

17. The method of claim 1 further comprising depositing a deformable layer over the upper mirror layer.

18. The method of claim 17 in which the upper mirror layer is suspended from the deformable layer after removal of the sacrificial layer.

* * * * *

UNITED STATES PATENT AND TRADEMARK OFFICE
CERTIFICATE OF CORRECTION

PATENT NO. : 7,553,684 B2 Page 1 of 1
APPLICATION NO. : 11/155379
DATED : June 30, 2009
INVENTOR(S) : Chui et al.

It is certified that error appears in the above-identified patent and that said Letters Patent is hereby corrected as shown below:

Title Page 5, at column 1, line 69, please delete "Quanum" and insert therefore, --Quantum--.

Title Page 6, at column 2, line 1, please delete "Internatioal" and insert therefore, --International--.

Title Page 6, at column 2, line 2, please delete "New Youk" and insert therefore, --New York--.

Title Page 6, at column 2, line 30, please delete "microelectomechanical systesm" and insert therefore, --microelectromechanical system--.

Title Page 6, at column 2, line 31, please delete "Comparision" and insert therefore, --Comparison--.

At column 1, line 25, please delete "and or" and insert therefore, --and/or--.

At column 6, line 34, please delete "respectively Relaxing" and insert therefore, --respectively. Relaxing--.

At column 14, line 34, please delete "region second" and insert therefore, --region of the second--.

At column 14, line 43-44, after "layer." please delete "the flex layer may also result in undesired premature etching of the underlying sacrificial layer.".

Signed and Sealed this

Twenty-third Day of February, 2010

David J. Kappos
*Director of the United States Patent and Trademark Office*